(12) United States Patent  (10) Patent No.: US 7,680,690 B1
Catalano  (45) Date of Patent: Mar. 16, 2010

(54) INTELLIGENT MENU ORDERING SYSTEM

(76) Inventor: Anthony B. Catalano, 13 Massey Row, Sugarland, TX (US) 77479-2539

( * ) Notice: Subject to any disclaimer, the term of this patent is extended or adjusted under 35 U.S.C. 154(b) by 981 days.

(21) Appl. No.: 11/430,740

(22) Filed: May 9, 2006

Related U.S. Application Data

(60) Provisional application No. 60/679,030, filed on May 9, 2005.

(51) Int. Cl.
*G06Q 30/00* (2006.01)
(52) U.S. Cl. ............... 705/15; 186/38; 340/286.09
(58) Field of Classification Search ............ None
See application file for complete search history.

(56) References Cited

U.S. PATENT DOCUMENTS

| | | | |
|---|---|---|---|
| 4,095,274 A * | 6/1978 | Gordon | 708/133 |
| 4,951,197 A * | 8/1990 | Mellinger | 600/300 |
| 5,412,560 A * | 5/1995 | Dennison | 600/300 |
| 5,813,026 A * | 9/1998 | Borg et al. | 711/115 |
| 5,819,735 A * | 10/1998 | Mansfield et al. | 600/300 |
| 5,954,640 A * | 9/1999 | Szabo | 600/300 |
| 7,024,369 B1 * | 4/2006 | Brown et al. | 705/2 |
| 7,090,638 B2 * | 8/2006 | Vidgen | 600/300 |
| 2006/0013773 A1 * | 1/2006 | Power | 424/9.81 |

\* cited by examiner

*Primary Examiner*—F. Ryan Zeender
*Assistant Examiner*—Fateh M Obaid
(74) *Attorney, Agent, or Firm*—Harrison Law Office, PC

(57) ABSTRACT

A methodology for customers seeking to purchase a meal from a food service vendor such as a restaurant, a cafeteria, or a vending machine, by ordering a food preparation based upon menu-selections. In addition to receiving ordered food, customers receive suggestions for optionally modifying their food orders based upon nutritional benefits and other criteria. Either during real-time customer-ordering or during post-ordering, a food-service vendor presents a customer suggestions specific to a pending tentative or completed order, wherein the customer may enjoy purported nutritional benefits by electing to follow these suggestions and thereby modify the tentative order into a corresponding completed order. Alternatively, the customer may elect to ignore these suggestions, but may nonetheless decide to effect such food-ordering modifications during subsequent visits. The food selection criteria implemented by a food service vendor is independent of individual customer identity and preferences, and are flexible and readily adaptable to accommodate changes such as a food service vendor's marketing strategy, customer-food preferences, discoveries pertaining to nutrition and consequent good health; and may be adapted to a plethora of food service environments. The preferred embodiment contemplates a restaurant environment in which customers typically approach a food-ordering counter and interface with both a menu display and with order-taking personnel. Other embodiments implicate kiosks, vending machines, remote access devices, and locally and remotely-accessed networked computers, wherein customers interact with automated computer-driven devices instead of or in addition to wait-staff or other food service personnel.

46 Claims, 24 Drawing Sheets

Continuous Refinement & Customization of IMOS Algorithm

FIG. 6

Database Tabulation: Hamburger Nutritional Information

| Food Option | Calories | Fat (g) | Sodium (mg) | Protein (g) |
|---|---|---|---|---|
| Beef Patty (Food Item) | 100 | 8 | 125 | 7 |
| Bun | 150 | 2 | 260 | 4 |
| Cheese | 50 | 4.2 | 80 | 2.7 |
| Lettuce | 0 | 0 | 0 | 0 |
| Tomato | 7 | 0.2 | 3 | 0.2 |
| Bacon | 70 | 5 | 300 | 5 |
| Onion | 10 | 0 | 0 | 0 |
| Pickles | 1 | 0 | 55 | 0 |
| Ketchup | 10 | 0 | 105 | 0 |
| Mustard | 0 | 0 | 10 | 0 |
| Mayonnaise | 50 | 5.5 | 40 | 0 |
| TOTAL | 448 | 24.9 | 978 | 18.9 |

FIG. 7

Database Tabulation: Hamburger Nutritional Points

|  | NP's From Calories | NP's From Fat | NP's From Sodium | NP's From Protein | Food Item/Option Total NP's |
|---|---|---|---|---|---|
| Beef Patty (Food Item) | 100 | 400 | 25 | -140 | 385 |
| Bun | 150 | 100 | 52 | -80 | 222 |
| Cheese | 50 | 210 | 16 | -54 | 222 |
| Lettuce | 0 | 0 | 0 | 0 | 0 |
| Tomato | 7 | 10 | 0.6 | -4 | 13.6 |
| Bacon | 70 | 250 | 60 | -100 | 280 |
| Onion | 10 | 0 | 0 | 0 | 10 |
| Pickles | 1 | 0 | 11 | 0 | 12 |
| Ketchup | 10 | 0 | 21 | 0 | 31 |
| Mustard | 0 | 0 | 2 | 0 | 2 |
| Mayonnaise | 50 | 275 | 8 | 0 | 333 |
| Total NP's Per Attribute | 448 | 1245 | 195.6 | -378 | 1510.6 |

FIG. 8

Database Tabulation: Hamburger Aggregated Meal Nutritional Information

|  | Quantity | Calories | Fat (g) | Sodium (mg) | Protein (g) |
|---|---|---|---|---|---|
| Beef Patty (Food Item) | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| French Fries – Large | 1 | 520 | 25 | 340 | 7 |
| Cola - Large | 1 | 200 | 0 | 25 | 0 |
| TOTAL |  | 1097 | 45.7 | 1093 | 23.2 |

FIG. 9

Database Tabulation: Hamburger Aggregated Meal Nutritional Points

|  | NP's From Calories | NP's From Fat | NP's From Sodium | NP's From Protein | Total NP's |
|---|---|---|---|---|---|
| Beef Patty (Food Item) | 100 | 400 | 25 | -140 | 385 |
| Bun | 150 | 100 | 52 | -80 | 222 |
| Tomato | 7 | 10 | 0.6 | -4 | 13.6 |
| Bacon | 70 | 250 | 60 | -100 | 280 |
| Mayonnaise | 50 | 275 | 8 | 0 | 333 |
| French Fries – Large | 520 | 1250 | 68 | -140 | 1698 |
| Cola – Large | 200 | 0 | 5 | 0 | 205 |
| TOTAL | 1097 | 2285 | 218.6 | -464 | 3136.6 |

FIG. 10
Customer Display
Hamburger Alternate Food Options

IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| TOTAL |  | 377 | 20.7 | 728 | 16.2 |

By replacing the bacon and mayonnaise with pickles and mustard, you could reduce the calories by 119 (32%), and the fat by 10.5 grams (51%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Pickles | 1 | 1 | 0 | 55 | 0 |
| Mustard | 1 | 0 | 0 | 10 | 0 |
| TOTAL |  | 258 | 10.2 | 453 | 11.2 |

FIG. 11
Customer Display
Hamburger Alternate Food Item – Same Food Category

IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| TOTAL |  | 377 | 20.7 | 728 | 16.2 |

By replacing the hamburger with a roast beef sandwich, you could reduce the calories by 57 (15%), and the fat by 7.7 grams (37%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Roast Beef Sandwich | 1 | 320 | 13 | 950 | 21 |

FIG. 12
Customer Display
Hamburger Alternate Food Item – Different Food Category IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| TOTAL |  | 377 | 20.7 | 728 | 16.2 |

By replacing the hamburger with beef stew, you could reduce the calories by 167 (44%), and the fat by 14.7 grams (71%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Stew | 1 | 210 | 6 | 680 | 16 |

FIG. 13
Customer Display
Aggregated Meal Alternate Food Options

IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| French Fries – Large | 1 | 520 | 25 | 340 | 7 |
| Cola – Large | 1 | 200 | 0 | 25 | 0 |
| TOTAL |  | 1097 | 45.7 | 1093 | 23.2 |

By replacing the bacon and mayonnaise with pickles and mustard, you could reduce the calories by 119 (11%) and the fat by 10.5 grams (23%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Pickles | 1 | 1 | 0 | 55 | 0 |
| Mustard | 1 | 0 | 0 | 10 | 0 |
| French Fries – Large | 1 | 520 | 25 | 340 | 7 |
| Cola – Large | 1 | 200 | 0 | 25 | 0 |
| TOTAL |  | 978 | 35.2 | 818 | 18.2 |

FIG. 14
Customer Display
Aggregated Meal Alternate Food Items – Same Food Category IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| French Fries – Large | 1 | 520 | 25 | 340 | 7 |
| Cola – Large | 1 | 200 | 0 | 25 | 0 |
| TOTAL |  | 1097 | 45.7 | 1093 | 23.2 |

By replacing the hamburger with a roast beef sandwich, and the French fries with mashed potatoes, you could reduce the calories by 467 (43%) and the fat by 28.7 grams (63%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Roast Beef Sandwich | 1 | 320 | 13 | 950 | 21 |
| Mashed Potatoes | 1 | 110 | 4 | 260 | 2 |
| Cola – Large | 1 | 200 | 0 | 25 | 0 |
| TOTAL |  | 630 | 17 | 1235 | 23 |

FIG. 15
Customer Display
Aggregated Meal Alternate Food Items – Different Food Category IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| French Fries – Large | 1 | 520 | 25 | 340 | 7 |
| Cola – Large | 1 | 200 | 0 | 25 | 0 |
| TOTAL |  | 1097 | 45.7 | 1093 | 23.2 |

By replacing the hamburger with beef stew, you could reduce the calories by 167 (15%) and the fat by 14.7 grams (32%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Stew | 1 | 210 | 6 | 680 | 16 |
| French Fries - Large | 1 | 520 | 25 | 340 | 7 |
| Cola – Large | 1 | 200 | 0 | 25 | 0 |
| TOTAL |  | 930 | 31 | 1045 | 23 |

FIG. 16

Database Tabulation: Hamburger Post Order Basis

|  | Quantity | Calories | Fat (g) | Sodium (mg) | Protein (g) |
|---|---|---|---|---|---|
| Beef Patty (Food Item) | 2 | 200 | 16.0 | 250 | 14 |
| Bun | 2 | 300 | 4 | 520 | 8 |
| Cheese | 1 | 50 | 4.2 | 80 | 2.7 |
| Tomato | 2 | 14 | 0.4 | 6 | 0.4 |
| Bacon | 1 | 70 | 5 | 300 | 5 |
| Pickles | 1 | 1 | 0 | 55 | 0 |
| Mayonnaise | 2 | 100 | 11.0 | 80 | 0 |
| Fries, Large | 2 | 1040 | 50 | 680 | 14 |
| Cola, Large | 2 | 400 | 0 | 50 | 0 |
| TOTAL |  | 2175 | 90.6 | 2071 | 44.1 |

FIG 17 - IMOS Logic Diagram
Limited Choice Basis – School or Institution

FIG. 19

Table of Examples of Food Categories, Food Items and Food Options

| Item # | Food Category | Food Item | Food Options |
|---|---|---|---|
| DR1 | Drinks | Cola | Small, Medium, Large |
| DR2 | Drinks | Diet Cola | Small, Medium, Large |
| DR3 | Drinks | Bottled Water | Small, Large |
| DR4 | Drinks | Chocolate Shake | Small, Large |
| DR5 | Drinks | Strawberry Shake | Small, Large |
| DR6 | Drinks | Coffee | Cream, Sugar, Sweet'N'Lo |
| DR7 | Drinks | Iced Ted | Sugar, Sweet'N'Lo |
| SW1 | Sandwiches | Hamburger | Cheese, lettuce, tomato, bacon, onion, pickles, ketchup, mustard, mayonnaise, bun |
| SW2 | Sandwiches | Double Hamburger | Cheese, lettuce, tomato, bacon, onion, pickles, ketchup, mustard, mayonnaise, bun |
| SW3 | Sandwiches | Fried Chicken | Lettuce, tomato, bacon, onion, pickles, ketchup, mustard, mayonnaise, bun |
| SW4 | Sandwiches | Spicy Chicken | Lettuce, tomato, bacon, onion, pickles, ketchup, mustard, mayonnaise, bun |
| SW5 | Sandwiches | Grilled Chicken | Lettuce, tomato, bacon, onion, pickles, ketchup, mustard, mayonnaise, bun |
| SA1 | Salads | Dinner Salad | Ranch, Italian, Low-Fat Ranch, Low-Fat Italian, Croutons |
| SA2 | Salads | Grilled Chicken Salad | Ranch, Italian, Low-Fat Ranch, Low-Fat Italian, Croutons |
| SA3 | Salads | Fruit Salad | Small, Large |
| PO1 | Potatoes | French Fries | Small, Medium, Large |
| PO2 | Potatoes | Roasted Potatoes | Small, Medium, Large |
| PO3 | Potatoes | Mashed Potatoes | Small, Medium, Large, Gravy |
| SP1 | Soups | Chicken Noodle | Cup, Bowl |
| SP2 | Soups | Navy Bean | Cup, Bowl |
| SP3 | Soups | Beef Stew | Cup, Bowl |

FIG. 21

Database Tabulation: Hamburger Nutritional Points – Low Sodium Diet

|  | NP's From Calories | NP's From Fat | NP's From Sodium | NP's From Protein | Food Item/Option TOTAL NP's |
|---|---|---|---|---|---|
| Beef Patty (Food Item) | 100 | 400 | 250 | -140 | 610 |
| Bun | 150 | 100 | 520 | -80 | 690 |
| Cheese | 50 | 210 | 160 | -54 | 366 |
| Lettuce | 0 | 0 | 0 | 0 | 0 |
| Tomato | 7 | 10 | 6 | -4 | 19 |
| Bacon | 70 | 250 | 600 | -100 | 820 |
| Onion | 10 | 0 | 0 | 0 | 10 |
| Pickles | 1 | 0 | 110 | 0 | 111 |
| Ketchup | 10 | 0 | 210 | 0 | 220 |
| Mustard | 0 | 0 | 20 | 0 | 20 |
| Mayonnaise | 50 | 275 | 80 | 0 | 405 |
| TOTAL NP's per attribute | 448 | 1245 | 1956 | -378 | 3271 |

FIG. 22

Database Tabulation: Hamburger Nutritional Points – High Protein Diet

| | NP's From Calories | NP's From Fat | NP's From Sodium | NP's From Protein | Food Item/Option TOTAL NP's |
|---|---|---|---|---|---|
| Beef Patty (Food Item) | 100 | 400 | 25 | -1400 | -875 |
| Bun | 150 | 100 | 52 | -800 | -498 |
| Cheese | 50 | 210 | 16 | -540 | -164 |
| Lettuce | 0 | 0 | 0 | 0 | 0 |
| Tomato | 7 | 10 | 0.6 | -40 | -22.4 |
| Bacon | 70 | 250 | 60 | -1000 | -620 |
| Onion | 10 | 0 | 0 | 0 | 10 |
| Pickles | 1 | 0 | 11 | 0 | 12 |
| Ketchup | 10 | 0 | 21 | 0 | 31 |
| Mustard | 0 | 0 | 2 | 0 | 2 |
| Mayonnaise | 50 | 275 | 8 | 0 | 333 |
| TOTAL NP's per attribute | 448 | 1245 | 195.6 | -3780 | -1891.4 |

FIG. 23
Customer Display
Hamburger Alternate Food Options – Low Sodium Diet

IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| TOTAL |  | 377 | 20.7 | 728 | 16.2 |

By replacing the bacon with onion, you could reduce the sodium content by 300 mg (41%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Onion | 1 | 10 | 0 | 0 | 0 |
| Mayonnaise | 1 | 50 | 5.5 | 40 | 0 |
| TOTAL |  | 317 | 15.7 | 428 | 11.2 |

FIG. 24
Customer Display
Hamburger Alternate Food Options – High Protein Diet

IMOS: You ordered:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Mayonnaise | 1 | 50 | 5.5 | 40 | 0 |
| TOTAL |  | 377 | 20.7 | 728 | 16.2 |

By replacing the mayonnaise with cheese, you could increase the protein content by 2.7 g (17%).

Do you wish to modify your order?

CUSTOMER: Yes

IMOS: Your revised order is:

|  | Quantity | Calories | Fat (g) | Sodium (mg) | Protein (g) |
|---|---|---|---|---|---|
| Beef Patty | 1 | 100 | 8.0 | 125 | 7 |
| Bun | 1 | 150 | 2 | 260 | 4 |
| Tomato | 1 | 7 | 0.2 | 3 | 0.2 |
| Bacon | 1 | 70 | 5 | 300 | 5 |
| Cheese | 1 | 50 | 4.2 | 80 | 2.7 |
| TOTAL |  | 377 | 19.4 | 768 | 18.9 |

INTELLIGENT MENU ORDERING SYSTEM

RELATED APPLICATIONS

This application claims priority based upon Provisional U.S. Application Ser. No. 60/679,030 filed May 9, 2005.

TECHNICAL FIELD OF THE INVENTION

The present invention relates to procedures for customer ordering of food, and, more particularly, relates to a methodology for enabling customers to place food orders from menu-selections based upon restaurant feedback pertaining to nutritional aspects of available menu selections.

BACKGROUND OF THE INVENTION

There is currently a prevalent concern among the citizenry for routinely consuming not only highly nutritional foods, but also foods having low-fat and/or low-carbohydrate attributes. Unfortunately, it has become common practice for customers to frequent fast-food restaurants without appreciable regard for nutritional content, while, nevertheless, being concerned about fat and/or carbohydrate content. A similar attitude is prevalent in visits to cafeterias and other eating venues, including vending machines.

There has been a paucity of developments in restaurant context pertaining to providing customers nutrition-related feedback and suggestions for intelligent menu-ordering of food in real-time or otherwise. There has also been a paucity of improvements for such intelligent menu-ordering in a post-order time frame, wherein the customer receives specific suggestions for the next food order based upon most-recent ordering attributes.

There has also been a paucity of methodologies which have been implemented without requiring the customer to use pre-requisite hardware, or without requiring the customer to review menu choices in advance. Furthermore, customers typically prefer to remain anonymous while obtaining customized suggestions for promoting good health and for generally becoming more knowledgeable regarding nutritional choices.

For instance, Brown, et al., in U.S. Pat. Nos. 6,618,062 and 6,646,659 disclose a method, system and program for specifying an electronic food menu with food preferences from a universally accessible database. Under the technology taught in Brown, food preferences are retrieved from a database based upon a unique customer key. The focus appears to be on incorporation of heart-healthy and otherwise healthy food to promote personal health. The customer's preferences are compared with previously specified and stored food items, requiring a customer to be identified. A customized food menu consisting of such selected food items is presented electronically to the customer.

Camaisa et al., in U.S. Pat. No. 5,845,263, teach an interactive visual ordering system having a database that stores a pictorial image for each menu item. This database also displays for each food item an enumeration of ingredients, method of preparation, and nutritional content—with the objective of rendering menu-ordering to be convenient and informational.

Accordingly, these limitations and disadvantages of the prior art are overcome with the present invention, and improved means and techniques are provided which enable customers to receive restaurant-feedback for effecting improved menu-selections that promote enhanced nutrition and good health.

SUMMARY OF THE INVENTION

The present invention teaches a methodology for customers seeking to purchase a meal or the like from a food service vendor such as a fast-food or regular sit-down restaurant, a cafeteria, and the like, by ordering a food preparation based upon menu-selections. According to this methodology, in addition to receiving ordered food, customers receive suggestions for optionally modifying their orders based upon nutritional benefits and other criteria. In particular, either during real-time customer-ordering or during post-order situations, a food-service vendor presents a customer suggestions specific to a pending tentative or completed order, respectively, wherein the customer may enjoy purported nutritional benefits by electing to follow these suggestions and thereby modify the order as appropriate. Alternatively, the customer may elect to ignore these suggestions for modifying an order, but may nonetheless decide to effect such food-ordering modifications during subsequent visits.

It is an advantage and feature of the present invention that the food selection criteria implemented by a restaurant and the like is independent of an individual customer's identity and preferences. It is also a feature of the present invention that embodiments of the methodology are flexible and readily adaptable to accommodate changes in a food service vendor's marketing strategy, in customer-food preferences, and in reference to discoveries related to nutrition and consequent good health.

It will become apparent to those knowledgeable in the food service art that embodiments of the present invention may be adapted to a plethora of food service environments. The preferred embodiment contemplates a fast-food restaurant or the like in which customers typically approach a food-ordering counter and interface with both a menu display and with order-taking personnel. Other embodiments contemplate a conventional more deliberate and formal sit-down, dine-in environment which does not feature expeditious ordering and speed of food preparation, but features taking of customer-tailored orders which are served in a professional, relaxed environment. Other embodiments of the present invention implicate freestanding structures and/or networked stations such as kiosks, vending machines, and the like, wherein customers interact with automated computer-driven machines instead of wait-staff or other restaurant personnel.

These and other objects and features of the present invention will become apparent from the following detailed description, wherein reference is made to the figures in the accompanying drawings in which like numerals refer to like components.

BRIEF DESCRIPTION OF THE DRAWINGS

FIG. 6 depicts a tabulation of a representative portion of a hamburger nutritional information database according to the present invention.

FIG. 7 depicts a tabulation of a representative portion of a hamburger Nutritional Points database according to the present invention.

FIG. 8 depicts a tabulation of a representative portion of a hamburger aggregated meal nutritional information database according to the present invention.

FIG. 9 depicts a tabulation of a representative portion of a hamburger aggregated meal Nutritional Points database according to the present invention.

FIG. 10 depicts a sample customer display indicative of a tabulation of a representative portion of a hamburger alternative food options database according to the preferred embodiment of the present invention.

FIG. 11 depicts a sample customer display indicative of a tabulation of a representative portion of a hamburger alternative food item pertaining to a same-food-category database according to the preferred embodiment.

FIG. 12 depicts a sample customer display indicative of a tabulation of a representative portion of a hamburger alternative food item pertaining to a different-food-category database according to the preferred embodiment.

FIG. 13 depicts a sample customer display indicative of a tabulation of a representative portion of an aggregate meal alternative food options database according to the preferred embodiment.

FIG. 14 depicts a sample customer display indicative of a tabulation of a representative portion of an aggregate meal alternative food items database pertaining to a same food category database according to the preferred embodiment.

FIG. 15 depicts a sample customer display indicative of a tabulation of a representative portion of an aggregate meal alternative food items database pertaining to a different food category database according to the preferred embodiment.

FIG. 16 depicts a tabulation of a representative portion of a hamburger post-order basis database according to the present invention.

FIG. 19 is a tabulation of examples depicting the hierarchical relationship between Food Categories, Food Items, and Food Options.

FIG. 21 depicts a tabulation of a representative portion of a hamburger Nutritional Points database featuring a low sodium diet according to the present invention.

FIG. 22 depicts a tabulation of a representative portion of a hamburger Nutritional Points database featuring a high sodium diet according to the present invention.

FIG. 23 depicts a sample customer display indicative of a tabulation of a representative portion of a hamburger alternative food options database featuring a low sodium diet according to the preferred embodiment of the present invention.

FIG. 24 depicts a sample customer display indicative of a tabulation of a representative portion of a hamburger alternative food options database featuring a high sodium diet according to the preferred embodiment of the present invention.

DETAILED DESCRIPTION

The present invention teaches an intelligent menu-based ordering system or methodology that affords food service vendors of restaurants, cafeterias, and the like, the capability to suggest food selection alternatives in order to achieve marketing and sales goals both in the short-term and in the long-term. It should be understood that the present invention contemplates food being vended in prepared, ready-to-eat form at a diversity of eating environments comprising fast-food restaurants, sit-down restaurants, take-out restaurants, public and private cafeterias, and even automated food services rendered by vending machines and the like.

For brevity and convenience, embodiments of the present invention will hereinafter be referred to as "IMOS" as an acronym for Intelligent Menu Ordering System. As will become clear to those skilled in the art, IMOS affords customers the advantage of effecting intelligent orders from menu selections in real-time or near-real-time. IMOS contemplates that customers' food selection alternatives are objective, i.e., are not specific to the idiosyncrasies of particular customers. That is, food selection criteria are targeted to a population of customers at-large, wherein the present invention envisions such customers as constituting a population of current and potential anonymous customers who have or who may frequent a particular restaurant or the like.

Accordingly, it will become evident that the instant methodology neither needs nor retains any customer-specific information. Thus, any embodiment hereof is inherently devoid of any customer-privacy concerns because it relies broadly upon a population or aggregation of customers located in either a citywide, countywide, statewide, regional, or even national arena. As will be herein described in detail, IMOS comprises a plurality of related databases that enable restaurants and the like to present predetermined suggestions and implicated information to customers for effecting nutritional orders and for promoting customer health by invoking intelligent menu selections.

Figure 1:
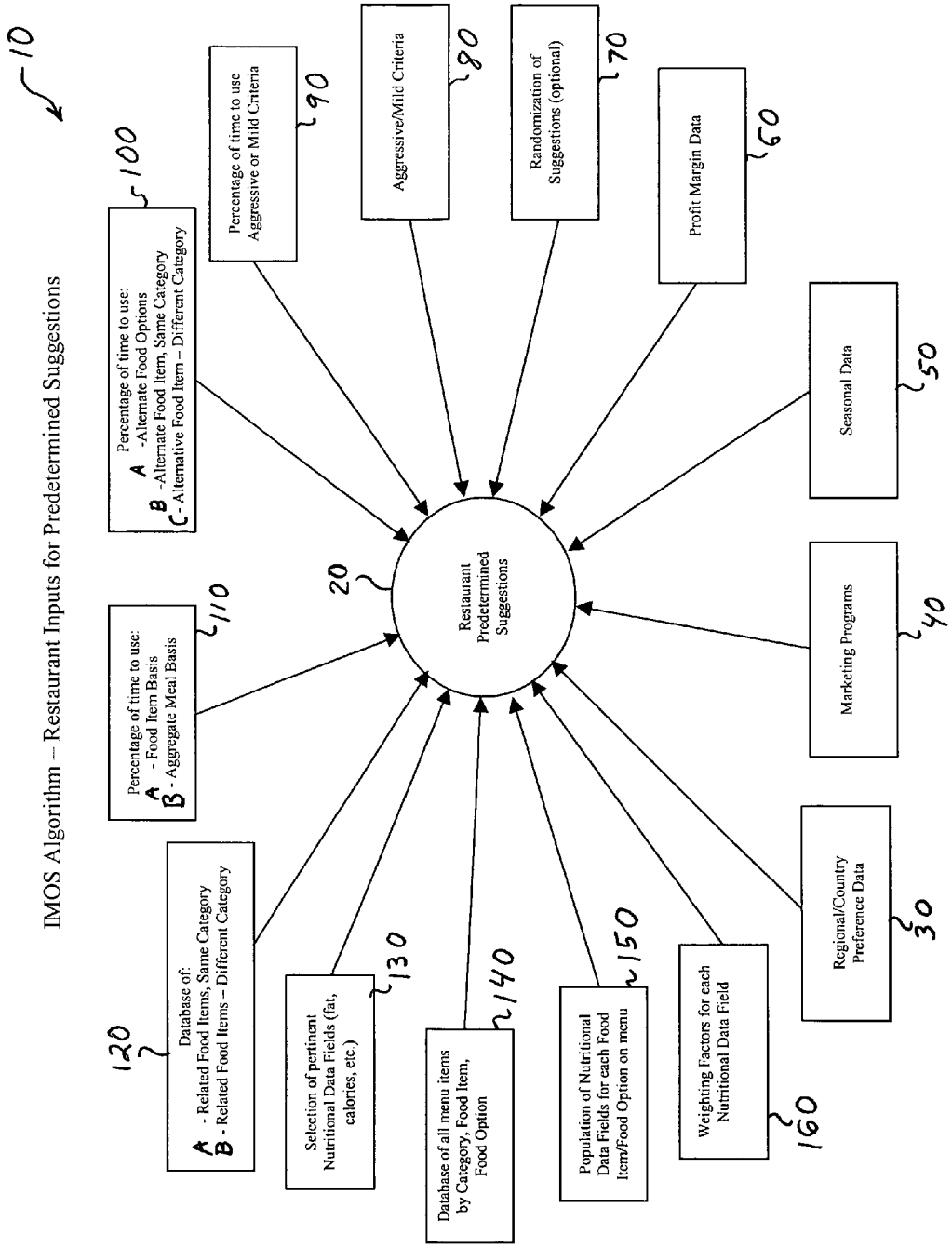
FIG. 1 depicts a simplified schematic corresponding to an overview of a plurality of input variables that underlie interrelationships and functionality that devolve to predetermined restaurant suggestions for embodiments of the present invention.

FIG. 1 is an overview—in simplified schematic form—that depicts a set of variables that comprise typical interrelationships and functionality contemplated by the present invention. More particularly, there is seen plurality of variables 10 which are functionally related to a corresponding plurality of predetermined suggestions 20 for a restaurant's menu-driven food selections. As is clearly shown, this plurality of predetermined suggestions is the focal point for receiving input from the plurality of functions and variables that are represented therein.

Hence, IMOS provides a food service vendor with a knowledge base comprising a set of databases that contain a diversity of customer-preference information aggregated within an appropriate geographical area 30 and customers' presumed seasonal preferences 50, and the like. The food service vendor's marketing strategies and logistics for a restaurant or the like is preferably subsumed into corresponding marketing programs 40 and related profit margin information 60. Notwithstanding, under IMOS' protocol, fundamental databases upon which food selection criteria are bottomed include a plurality of related food item selections either in the same category 120A or in different categories 120B; a plurality of representative nutritional attributes to be comparatively considered 130, such as calories and fat; a plurality of all menu items classified by Food Category, Food Item, and Food Option 140; a population of nutritional item values 150 related to each menu-driven Food Item selection; and a plurality of weighting factors 160 for each comparatively evaluating the contribution of each nutritional attribute.

Thus, it will be evident to those conversant in the art that the instant methodology synergizes the restaurant knowledge base—manifest in a plurality of databases—and the underlying associated algorithms to achieve the purposes taught hereunder.

A restaurant's ordering database of all possible Food Items, e.g. a hamburger or hot dog, and Food Options for each Food Item, e.g. mustard, ketchup, mayonnaise, or portion size, 140 would be logically related to: a database containing the fields of relevant nutritional information 130 (fat, calories, etc.); a database of related Food Items of the same Food Category, e.g., a drink or a sandwich, 120A and of different Food Categories 120B, respectively; and a database containing the nutritional data in each relevant, field for each Food Item or Food Option 150.

As will be hereinafter described, the present invention also incorporates a database having a plurality of restaurant-determined weighting factors 160 for each nutritional attribute. IMOS first calculates a plurality of a restaurant's customized alternative suggestions during customers' food-ordering protocol and then shares these alternatives with customers as herein described. It should be clearly understood that embodiments of the present invention are premised upon a plurality of each the Food Categories, Food Items, and Food Options which are all preselected with associated values thereof—as predetermined by a particular restaurant.

FIG. 19 corresponds to a tabulation of representative food item examples that are indicative of the hierarchy of interdependent relationships between Food Categories and Food Items and Food Options. The column headers thus indicate that, for each food item abbreviation identified in column 1, there is displayed the corresponding Food Category in column 2; the corresponding Food Item in column 3; and the corresponding Food Options in column 4. It will be seen that each of the drink-related items representative of the "Drinks" Food Category (rows 2-8) is abbreviated as "DRi" where "DR" is an acronym for Drink and "i" corresponds to the number of the particular drink-item. Ergo, in row 2 of this table, DR1 corresponds to a cola Food Item (column 3) having Small, Medium and Large Food Options (column 4). Similarly, in row 5, DR4 corresponds to a chocolate shake Food Item (column 3) having Small and Large Food Options (column 4); in row 8, DR7 corresponds to an iced tea Food Item (column 3) having Sugar and Sweet 'N' Lo Food Options (column 4). It should be evident to those conversant in the art that each food item identified by acronym "DR" is a member of Drinks Food Category.

Still referring to the table depicted in FIG. 19, it will be seen that each of the sandwich items representative of the "Sandwiches" Food Category (rows 9-13) is abbreviated as "SWi" where "SW" is an acronym for Sandwich and "i" corresponds to the number of the particular sandwich-item. Ergo, in row 9 of this table, SW1 corresponds to a Hamburger Food Item (column 3) having Cheese, lettuce, tomato, bacon, onion, pickles, ketchup, mustard, mayonnaise, and Bun Food Options (column 4). Similarly, in row 11, SW3 corresponds to a Fried Chicken sandwich Food Item (column 3) having Cheese, lettuce, tomato, bacon, onion, pickles, ketchup, mustard, mayonnaise, and Bun Food Options (column 4); in row 13, SW5 corresponds to a Grilled Chicken sandwich Food Item (column 3) having Cheese, lettuce, tomato, bacon, onion, pickles, ketchup, mustard, mayonnaise, and Bun Food Options (column 4). It should be evident to those conversant in the art that each Food Item identified by acronym "SW" is a member of Sandwiches Food Category.

It will also be understood that food classifications contemplated hereunder include not only all Food Categories, but also include each possible combination of Food Item and Food Options. Pertinent nutritional attribute data are preferably used to evaluate the plurality of Food Item—Food Option combinations which introduce calories, fat, sodium, protein, and the like into a customer's diet. A plurality of correlated restaurant-selected Nutritional Weighting Factors are used for each corresponding nutritional attribute. The present invention further contemplates that comparative nutritional values will be provided for each nutritional attribute which is, in turn, functionally related to each Food Item—Food Option combination to permit the calculation of an overall numerical nutritional point score. It will become clear to those skilled in the art that an overall nutritional score contemplated hereunder is identified as constituting "Nutritional Points" which is, in turn, abbreviated herein as "NP" for convenience.

It should be understood that embodiments of the present invention may suggest alternative menu selections either on a Food Item basis or on an Aggregated Meal basis. More particularly, menu-selection alternatives may be generated, on the one hand, for each Food Item; this approach corresponds to a Food Item basis. On the other hand, instead of focusing upon a particular Food Item, menu-selection alternatives may be generated by considering all of the Food Items and concomitant Food Options constituting an order, and then comparing nutritional attributes for the entire meal with pre-established standards; this approach corresponds to an Aggregated Meal basis.

Now referring again to FIG. 1, there is seen a schematic of the plurality of functions that factor into a restaurant's determination of suitable meal-selections for customers to consider before placing an order. For instance, there is shown the functions that pertain to time allocations, preferably on a statistical basis, that are deemed appropriate by a restaurant for suggesting alternative food selections to customers. Of course, as is well known in the art, time allocations may be assessed from empirical data depending upon customer feedback manifest as complaints and compliments, rather than just by stochastically observing customer behavior.

In particular, there is seen variable 110 representing percentage of time to use Food Item basis 110A compared with time to use Aggregated Meal basis 110B; variable 100, broken down into three sub-variables: 100A representing percentage of time to select alternate Food Options, variable 100B representing percentage of time to select alternate Food Item—in the same Food Category, and variable 100C representing percentage of time to select alternate Food Item—in a different Food Category; and variable 90 representing percentage of time to make aggressive compared with mild (conservative) suggestions. As will be understood by those skilled in the art, this plurality of variables, in conjunction with IMOS' food and nutrition-related databases, comprise IMOS' plurality of algorithms that ascertain the options for and concomitant feasibility of assigning a suitable marketing and sales program 40 to a particular restaurant in a particular geographical region.

While there are several acceptable ways for a restaurant to provide menu-selection criteria to customers, preferred embodiments of the present invention offer customers at least two feedback opportunities. First, a restaurant may display sufficient information for customers to immediately view menu-selections and place imminent orders therefrom in real-time. Second, a restaurant may feed customers paper-form output that is generated immediately after order-placement, which preferably exemplify the benefits of effectuating such changes to the selections made during the current food-order, for use in making healthier selections during subsequent visits. Of course, a customer may opt to use any of these suggestions as a ready-reference during menu-selections at subsequent restaurant visits. Indeed, if a customer were aggressive and instantaneously became overwhelmed with health concerns, the ordered-food presumably could be refused and a healthier choice made.

Thus, IMOS' real-time behavior may correspond to a restaurant presenting customers a display of pertinent nutritional information prior to customers' placing food orders. Representative screens contemplated by the present invention are depicted in FIGS. 10-15. It will be appreciated that IMOS may dynamically prompt customers via nutritionally-biased food-suggestions preferably simultaneously with each food-ordering cycle. For instance, a customer may view a display described herein which may be augmented by an order-taking clerk asking: "Would you like to try alternative 'X'?" Instead, IMOS may automatically display nutritional attribute values and options for a customer to consider on an auxiliary screen displaying nutritional attributes related to the customer's original order.

As depicted in FIG. 10, a display screen may present the customer with confirmation of an order, augmented with the nutritional attribute values associated with each alternative Food Option. Hence, row 2 enumerates that, for enjoying a single hamburger patty, the customer will intake 100 calories, 8.0 grams of fat, 125 milligrams of sodium, and 7 grams of protein. Similarly, row 5 enumerates that, for enjoying bacon with the single hamburger patty, the customer will intake an additional 70 calories, 5.0 grams of fat, 300 milligrams of sodium, and 5 grams of protein; row 6 enumerates that, for enjoying mayonnaise with the single hamburger patty, the customer will intake an additional 50 calories, 5.5 grams of fat, 40 milligrams of sodium, and no protein. IMOS advises this customer that calories could be reduced by 32% and fat could be reduced by 51% if bacon and mayonnaise ere replaced with pickles and mustard. If the customer agrees to modify the order by positively responding to the modification request, then the revised order is displayed on-screen. The improved nutritional attribute values are clearly shown for the customer's immediate satisfaction.

Depicted in FIG. 11 is a display screen presenting the customer with an opportunity to change an order with an alternative Food Item which is situated in the same Food Category as the original Food Item. More particularly, under this protocol, the beef hamburger sandwich Food Item on a bun with tomato, bacon, and mayonnaise Food Options may be changed to a roast beef sandwich. It can be seen that, in the customer's revised order, the intake will be reduced by 57 calories—corresponding to a 15% reduction—and by 7.7 grams of fat—corresponding to a 37% reduction.

On the other hand, FIG. 12 illustrates a display screen in which IMOS offers a customer the opportunity to change a pending or tentative order to an alternative Food Item, but in a Food Category different from the original: from a basis beef hamburger sandwich Food Item on a bun with tomato, bacon, and mayonnaise Food Options to beef stew. The benefit is shown to be a reduction of 167 calories—corresponding to 44%—and by 14.7 grams of fat—corresponding to 71%. Opting to make the change, the customer promptly receives visual feedback that the order has been revised to 210 calories, 6 grams of fat, 680 milligrams of sodium, and 16 grams of protein. It will be seen that this display also enumerates the nutritional attribute values associated with each Food Option. Hence, row 2 enumerates that, for partaking of a single hamburger patty, the customer will intake 100 calories, 8.0 grams of fat, 125 milligrams of sodium, and 7 grams of protein. Similarly, row 5 enumerates that, for partaking of bacon, the customer will intake an additional 70 calories, 5.0 grams of fat, 300 milligrams of sodium, and 5 grams of protein; row 6 enumerates that, for partaking of mayonnaise, the customer will intake an additional 50 calories, 5.5 grams of fat, 40 milligrams of sodium, and no protein. As hereinbefore described, if the customer agrees to modify the order by positively responding to the modification request, then the revised order is displayed on-screen. The improved nutritional attribute values are clearly shown for the customer's immediate satisfaction.

FIG. 13 illustrates a display screen in which a customer is presented with the opportunity to change a tentative Aggregated Meal order to select alternative Food Options: from a beef hamburger sandwich Food Item with bun, tomato, bacon and mayonnaise Food Options to this beef hamburger sandwich Food Item but only having a bun, pickles and mustard. The benefit is shown to be a reduction of 119 calories—corresponding to 11%—and by 10.5 grams of fat—corresponding to 23%. Opting to make the change, the customer promptly receives visual feedback that the order has been revised to 978 calories, 35.2 grams of fat, 818 milligrams of sodium, and 18.2 grams of protein. It will be seen that this display also enumerates the nutritional attribute values associated with each Food Option.

Hence, row 2 enumerates that, for partaking of a single hamburger patty, the customer will intake 100 calories, 8.0 grams of fat, 125 milligrams of sodium, and 7 grams of protein. Similarly, row 5 enumerates that, for partaking of pickles, the customer will intake an additional single calorie, no fat, 55 milligrams of sodium, and no protein; row 6 enumerates that, for partaking of mustard, the customer will intake no additional calories, no fat, 10 milligrams of sodium, and no protein. Accordingly, if the customer agrees to modify the order by positively responding to the modification request, then this revised order is displayed on-screen. The improved nutritional attribute values of the completed order are clearly shown for the customer's immediate satisfaction.

Now referring to FIG. 14, there is depicted a representative illustration of a display screen in which a customer is presented with the opportunity to change a pending, tentative Aggregated Meal order for selecting alternative Food Items in the same respective Food Categories: from a beef hamburger sandwich on a bun with tomato, bacon, and mayonnaise Food Options, and French Fries Food Items to a similar roast beef sandwich with mashed potatoes. The benefit is shown to be a reduction of 467 calories—corresponding to 43%—and by 28.7 grams of fat—corresponding to 63%. Opting to make the change, the customer promptly receives visual feedback that the order has been revised to 630 calories, 17.0 grams of fat, 1235 milligrams of sodium, and 23.0 grams of protein. Ergo, while calories and fat have been significantly reduced, i.e., a negative differential, protein remains the same, and sodium is increased, i.e., a positive differential. The revised nutritional attribute values of this completed order are preferably displayed for the customer's edification.

Similarly, FIG. 15 depicts a representative illustration of a display screen in which a customer is presented with the opportunity to change a pending Aggregated Meal order for selecting alternative Food Items in different respective Food Categories: from a beef hamburger sandwich on a bun with tomato, bacon, mayonnaise Food Options, and large French Fries Food Items to beef stew also with large French Fries. The benefit is shown to be a reduction of 167 calories—corresponding to 15%—and by 14.7 grams of fat—corresponding to 32%. Opting to make the change, the customer promptly receives visual feedback that the order has been revised to 930 calories, 31.0 grams of fat, 1045 milligrams of sodium, and still 23 grams of protein. Ergo, while calories and fat have been significantly reduced, sodium is slightly decreased, and protein remains approximately the same. As is the norm, the revised nutritional attribute values are displayed for the customer's edification.

On the other hand, IMOS' post-order behavior may correspond to a restaurant presenting to customers a plurality of printed documents, including pertinent nutritional attributes and values, and suggesting food-selections in anticipation of customers' subsequent visits. For convenience, these two feedback behavioral methodologies of the present invention are referred to as "Real-Time Feedback" and "Post-Order Feedback," respectively. The restaurant may have a consistent preference for either of these feedback methods, or it may elect to apply each during different circumstances. For example, during busy periods, a fast-food restaurant may elect the Post-Order Feedback method to assure that rapid customer service occurs, while reverting to Real-Time Feedback during quieter periods.

It should be clear to those skilled in the art that the food-selection suggestions taught by the present invention are inherently objective: since no customer information is retained on-file, the plurality of suggestions tendered by IMOS would be the same for all customers and would be universally applicable thereto. That is, notwithstanding the possible randomization of certain suggestions discussed herein, IMOS offers the same set of food-selection suggestions to any customer placing a food order at a restaurant identified by geographic location and by the customer's order defined by a particular time frame. As will be described hereunder, the menu-ordering method taught by the present invention has prerequisite intelligence for "knowing" what alternatives to suggest as a function of a panoply of pre-established restaurant food-choices.

The underlying nutrition-related determinations of the present invention depend from the nutritional attributes associated with the panoply of food and drink served in a particular restaurant. A restaurant's assortment of menu-selections herein broken down into Food Category, Food Items, and Food Options should preferably be stored in a relational database structure, so that pertinent items for a particular category and a plethora of corresponding options for ordering such pertinent items will be immediately retrievable.

Similarly, it is contemplated that associated nutritional attributes for each combination of Food Item and Food Option will likewise be immediately retrievable. Once all prerequisite data are on-hand, IMOS then preferably performs its nutrition calculations, yielding alternative food selections for customers' consideration. Contemporaneously, IMOS presents the downstream ramifications of its calculations wherein customers are encouraged to improve particular nutritional thresholds associated with food selections—either on a Food Item basis or on an Aggregated Meal basis. Simultaneously, of course, IMOS seeks to be consistent with a restaurant's marketing and sales objectives during a predetermined time horizon.

It will be understood that a restaurant's ordering database should preferably contain relevant nutritional information for each Food Category, namely, Sandwiches, Soups, Salads, Drinks; and each Food Item, namely, Hamburger, Fried Chicken, Grilled Chicken, Beef Stew, Fruit Salad, Dinner Salad, Bottled Water, Diet Coke, Coke, Milk Shake; and for each Food Option for each Food Item, namely, Mustard, Mayonnaise, Pickle, Bun, etc. As will become clear to those skilled in the art, data are selectively retrieved from underlying IMOS restaurant-specific databases whereupon these selected data are fed into an analytical engine comprising a set of algorithms and the like. After the analytical engine completes its data processing as contemplated hereunder, comparative nutritional values are then available for customer-presentation: thus, customers may select alternative food and drink orders in real-time.

Inherent in the approach implemented in the preferred embodiments is that restaurants solely establish optimum combinations of Food Categories, Food Items, and Food Options that may be ordered by customers thereat. Accordingly, after a restaurant has established its panoply of menu selections, IMOS anticipates interacting with customers by communicating that nutritional benefits will flow to the customers for learning to effect nutritionally-advantageous revisions to prior menu-selections. Referring again to the tabulated data depicted in FIG. 19, there are shown examples indicative of the myriad menu selections that obtain from hierarchical interrelationships between Food Category, Food Item, and Food Option.

Now referring to Table 1, there is seen the following interrelationship between Food Items and corresponding Food Options for the "Drinks" Food Category.

TABLE 1

Food Items & Options for "Drinks" Food Category

| Item # | Food Item | Food Option |
| --- | --- | --- |
| 1 | Cola | Small, Medium, Large |
| 2 | Diet Cola | Small, Medium, Large |
| 3 | Bottled Water | Small, Large |
| 4 | Chocolate Shake | Small, Large |
| 5 | Strawberry Shake | Small, Large |
| 6 | Coffee | Cream, Sugar, Sweet 'N' Lo |
| 7 | Iced Tea | Sugar, Sweet 'N' Lo |

The seven illustrative Food Items shown—corresponding to the drink category—are Cola, Diet Cola, Bottled Water, Chocolate Shake, Strawberry Shake, Coffee, and Iced Tea. While container size is typically an option for any sort of drink, the Food Options shown in Table 1 have been simplified for illustrative purposes only. Thus, Food Options for Sodas are Small, Medium or Large size container. Similarly, Food Options for Bottled Water and Shakes are Small or Large size container. As clearly shown in cell (7,3)—corresponding to the intersection of row 7 and column 3—customers ordering coffee have the option of requesting it with cream, sugar, and/or Sweet 'N' Lo. Similarly, customers ordering iced tea have the option of requesting it with sugar, and/or Sweet 'N' Lo in cell (8,3).

Referring now to Table 2, there is also seen the interrelationship between Food Items and corresponding Food Options for the "Sandwiches" Food Category.

TABLE 2

Food Items & Options for Sandwiches Food Category

| # | Food Item | Food Option |
| --- | --- | --- |
| 1 | Hamburger | Cheese, lettuce, tomato, bacon, onion, pickles, ketchup, mustard, mayonnaise, bun |

TABLE 2-continued

Food Items & Options for Sandwiches Food Category

| # | Food Item | Food Option |
|---|---|---|
| 2 | Double Hamburger | Cheese, lettuce, tomato, bacon, onion, pickles, ketchup, mustard, mayonnaise, bun |
| 3 | Fried Chicken | Lettuce, tomato, bacon, onion, pickles, ketchup, mustard, mayonnaise, bun |
| 4 | Spicy Chicken | Lettuce, tomato, onion, pickles, ketchup, mustard, mayonnaise, bun |
| 5 | Grilled Chicken | Lettuce, tomato, onion, pickles, ketchup, mustard, mayonnaise, bun |

The five illustrative Food Items shown—corresponding to the Sandwiches category—are Hamburger (row 2), Double Hamburger (row 3), Fried Chicken (row 4), Spicy Chicken (row 5), and Grilled Chicken (row 6). Commonly invoked sandwich options, as shown herein, pertain to a bun and the usual selection of condiments. As an example, cell (5,3) represents customers ordering Spicy Chicken and having the option of requesting a bun and a plurality of condiments including lettuce, tomato, onion, pickles, ketchup, mustard, and mayonnaise. The same choices are available to customers ordering Grilled Chicken, as shown in cell (6,3).

Now referring to Table 3, there is seen the interrelationship between Food Items and certain corresponding Food Options for the "Salads" Food Category.

TABLE 3

Food Items & Options for Salads Food Category

| # | Food Item | Food Option |
|---|---|---|
| 1 | Dinner Salad | Ranch, Italian, Low-Fat Ranch, Low-Fat Italian, Croutons |
| 2 | Grilled Chicken Salad | Ranch, Italian, Low-Fat Ranch, Low-Fat Italian, Croutons |
| 3 | Fruit Salad | Small, Large |

The three illustrative Food Items shown—corresponding to the Salads category—are Dinner Salad (row 2) and Grilled Chicken Salad (row 3), respectively, indicative of a conventional "tossed" salad and a tossed salad with added grilled chicken, on the one hand; and Fruit Salad (row 4), indicative of a conventional fruit/non-tossed salad, on the other hand. Commonly invoked tossed salad options shown in cells (2,3) and (3,3) pertain to Ranch and Italian salad dressing—either low-fat or regular varieties; commonly invoked Fruit Salad option is either small or large serving-size.

Table 4 illustrates the interrelationship between Food Items and certain corresponding Food Options for the Potatoes Food Category.

TABLE 4

Food Items & Options for Potatoes Food Category

| # | Food Item | Food Option |
|---|---|---|
| 1 | French Fries | Small, Medium, Large |
| 2 | Roasted Potatoes | Small, Medium, Large |
| 3 | Mashed Potatoes | Small, Medium, Large, Gravy |

The three illustrative Potatoes-category Food Items shown are the classical favorite of French Fries, and other choices comprising Roasted or Mashed Potatoes (in rows 2, 3, and 4, respectively). Commonly invoked Potatoes-options shown in each of cells (2,3) and (3,3) pertain to serving-size of either Small, Medium, or Large; and in cell (4,3) pertains to serving-size of Small, Medium, or Large, and to gravy-option for Mashed Potatoes.

Table 5 shows the interrelationship between Food Items and corresponding Food Options for the Soups Food Category.

TABLE 5

Food Items & Food Options for Soups Food Category

| # | Food Item | Food Option |
|---|---|---|
| 1 | Chicken Noodle | Cup, Bowl |
| 2 | Navy Bean | Cup, Bowl |
| 3 | Beef Stew | Cup, Bowl |

In this illustration, Chicken Noodle, Navy Bean, and Beef Stew Food Items are enumerated—all included in the Soups Food Category. Commonly invoked Soup Options represented in each of rows 2, 3, and 4 pertain to customers' specifying either a cup or bowl serving-size.

While it will be understood that there are several database designs that may be invoked to implement the methodology of the present invention, preferred embodiments contemplate coordinating customers' applicable menu selections with intrinsic nutritional values thereof, so that comparative analyses may be conducted in real-time or near-real-time. In one embodiment, IMOS comparatively assesses a customer's choices against nutritional content and then shares its assessment with interested customers. Besides providing a plurality of restaurant-customers with beneficial health and nutritional information concomitant with various food-ordering combinations, embodiments of the present invention may also afford a plurality of benefits to restaurant owners and the like. For instance, algorithms comprising IMOS' underlying computational engine enable restaurants to establish and sustain marketing and sales objectives (profit margin, etc.), while seeking to satisfy its dietary and nutritional guidelines and/or requirements.

As will become evident from the illustrative examples enumerated herein, IMOS preferably recommends alternative Food Items and associated Food Options that are not only healthier and more nutritious than baseline food orders, but also implicate greater downstream profits. IMOS and its implementations that can vary on a restaurant-by-restaurant basis may also be an effective means for differentiating the restaurant from its competitors. As an example of such a healthier and more nutritional suggestion pertaining to a Food Item in the Sandwiches Food Category, a customer's original Fried Chicken Sandwich selection may be superseded by a healthier grilled chicken sandwich.

Another aspect of the IMOS database structure comprises a database that incrementally compiles a cumulation of all suggestions generated and the frequency of concomitant acceptance, rejection, or modification thereof by customers. While IMOS contemplates that this underlying database structure is preferably inherently accumulated on a customer-anonymous basis, this historical compilation may nevertheless be analyzed by restaurant, by geographic region, by time period, by season, etc., in order to help restaurant management recon current and future promotions. For instance, management may expeditiously ascertain: efficacy of marketing programs; and theoretical improvements designed to increase the probability of subsequent IMOS suggestions being adopted by a restaurant's customer-base.

Table 6 illustrates the contemplated scope of Food Item-based alternative menu-selections. Assuming that a customer has ordered a fried chicken sandwich with mayonnaise, IMOS orchestrates a restaurant suggesting three alternatives for ordering a chicken sandwich, via this Food Item approach.

TABLE 6

IMOS Menu-Selection Alternatives - Food Item Basis

| # | Suggestions | Comments |
|---|---|---|
| 1 | No mayonnaise, but include mustard | Suggestion retains Same Food Item; suggests Alternative Food Option (SFI-AFO) |
| 2 | Replace fried with grilled chicken | Suggestion is for Alternative Food Item in the Same Food Category; (AFI-SFC) - sandwiches |
| 3 | Replace sandwich with grilled chicken salad; plain or low-fat dressing | Suggestion is for Alternative Food Item in a Different Food Category (AFI-DFC); salads - but still features a common element - chicken |

It should be understood that a restaurant would have a similar table for each Food Item/Food Option combination. If it were deemed advantageous to reduce the number of such combinations to an acceptable level, then only certain groupings of similar combinations would be available for customers' selection.

Furthermore, a restaurant may elect to utilize only one alternative per Food Item/Food Option combination; a restaurant may also elect to make available to customers randomly selected menu suggestions from a more elaborate, longer list of menu selections. Those skilled in the art will appreciate that randomization techniques can afford a restaurant an opportunity to introduce customers to novel and different food-selection approaches that could be invoked on subsequent restaurant-visits.

The Food Item basis could suggest Alternative Food Options for the Same Food Item (SFI-AFO), for example retaining the Fried Chicken Sandwich but replacing mayonnaise with mustard, as in row 2 of Table 6; alternative, (but related) Food Items in the Same Food Category (AFI-SFC), e.g., suggesting a grilled chicken sandwich instead of a fried chicken sandwich, as in row #3; or Alternative, (but related) Food Items in Different Food Categories (AFI-DFC), e.g., substituting non-sandwich chicken dishes such as grilled chicken salad, as in row #4.

For the Aggregated Meal basis, a restaurant may provide a similar ensemble of Food Item/Food Option combinations, as enumerated in Table 7. The groupings would not necessarily include all potential combinations, but could analyze nutrition on an aggregated basis; then, this analysis could be compared with a "balanced meal" as prescribed by the restaurant; or suggestions could be targeted to reduce the number of Nutritional Points by a certain percentage, or by any other algorithm selected by the restaurant. In this example, the customer's initial meal choices are a fried chicken sandwich with mayonnaise, large French fries, and a large chocolate shake.

The strategy would be for the proposed meal alternatives to draw from this initial order, seeking acceptable customer-friendly options, e.g., healthier chicken, potato, and drink-choices. As for the Food Item basis, suggestions could be based upon the SFI-AFO, AFI-SFC and AFI-DFC methods. It is also contemplated that the Aggregated Meal Basis would be invoked by a restaurant to make suggestions for larger orders applicable to customer-groups such as (families, friends, co-workers)—who prefer to receive only one food bill, or to process customers more quickly than would normally be prerequisite for generating and handling orders on a Food Items Basis during busy periods.

TABLE 7

IMOS Menu-Selection Alternatives - Aggregated Meal Basis

| # | Suggestions | Comments |
|---|---|---|
| 1 | Bowl of chicken soup; mashed potatoes, no gravy; large bottled water | Aggressive suggestions to impact nutrition |
| 2 | Grilled chicken sandwich with mayonnaise; large roasted potatoes; large diet soda | Mild suggestions to influence nutrition |

According to the teachings of the present invention, for either the Food Item or Aggregated Meal basis, a restaurant may choose Aggressive or Mild suggestions 80 to promote the likelihood that customers will entertain, accept and adopt tendered suggestions. As indicated in this tabulation of menu-selection alternatives for Aggregated Meal Basis, Aggressive suggestions tend to introduce significant changes corresponding to the healthiest alternative. Such Aggressive suggestions may be less likely to be entertained and accepted by customers than are Mild suggestions. It should be evident that Mild suggestions typically constitute more modest changes which may be more likely to be accepted by the customer. It should be evident that a Mild suggestion could function as a transition to an Aggressive suggestion. Of course, a restaurant may also elect to afford a spectrum of Aggressive or Mild suggestions from which menu-choices are randomly selected 70. This randomization may also be applied to any other selection features, such as use of SFI-AFO, AFI-SFC, or AFI-DFC; Food Item vs. Aggregated Meal Basis, etc.

It should be clearly understood that the present invention contemplates that there are potentially myriad ways for a restaurant to establish a framework for customer-ordering logistics. Ergo, this plurality of implementations may be designed to accomplish particular primary objectives such as test-marketing of new products, offering discounts for particular menu-choices and food-combinations, offering time-limited seasonal menu-choices, etc.

Figure 2:
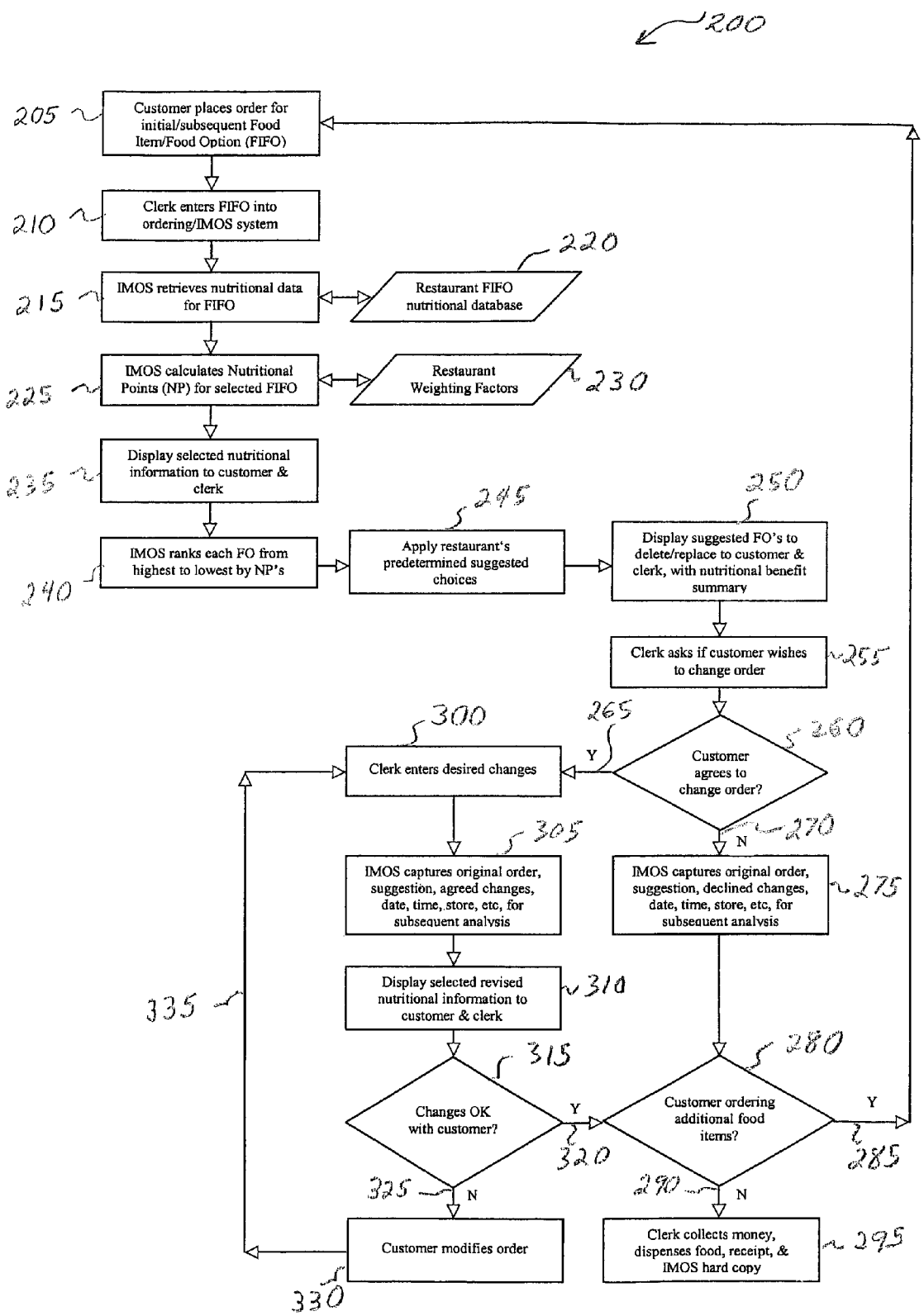
FIG. 2 depicts underlying logic implemented in the preferred embodiment for a typical fast-food restaurant, wherein customers place Food Item orders.

FIGS. 2-5, inclusive, depict logic diagrams pertinent to restaurant environments, indicative of menu-selection internal algorithms upon which embodiments of the present invention depend. In particular, FIG. 2 depicts the underlying logic implemented in IMOS for a typical fast-food restaurant, wherein customers place orders in real-time. As will be understood by those skilled in the art, logic diagram 200 pertains to IMOS ascertaining nutritional values and simultaneously suggesting alternative orders on a Food Item Basis, wherein each Food Item, e.g., a hamburger, may be ordered with any number of Food Options, e.g., ketchup, pickles, etc. The combination of the ordered Food Item and its associated Food Option(s) is hereinafter referred to as "FIFO."

The methodology contemplated by the preferred embodiment of the present invention commences when a customer approaches a counter in a conventional fast-food restaurant to be greeted by an employee. As represented in block 205, the customer places an order for a first Food Item; in this illustration, the customer orders a hamburger with a bun, tomato, bacon, and mayonnaise. The employee enters this order into the restaurant's combined ordering/IMOS, at block 210.

Preferably, after retrieving from nutritional database 220 relevant nutritional values for the customer's FIFO 215, IMOS calculates Nutritional Points 225 by invoking this restaurant's weighting factors 230. Counter display 235 shows the customer relevant nutritional values, e.g., grams of fat, salt content, calories, etc. More particularly, FIGS. 11-15, inclusive, illustrate representative display screens; FIG. 11 depicts a customer display of the database tabulation and suggestions using hamburger alternative food options; FIG. 12 depicts a customer display of the database tabulation and suggestions using hamburger alternative food options in the same food category; FIG. 13 depicts a customer display of the database tabulation and suggestions using hamburger alternative food options in a different food category. Block 240 represents IMOS ranking of each Food Option from highest to lowest Nutritional Points This ranking may be used by a restaurant to select one or more alternatives that have a relatively large impact—referred to as an "aggressive" impact—or a relatively small impact—referred to as a "mild" impact—on the nutritional value of the FIFO currently being ordered.

FIG. 7 depicts a database tabulation indicative of total NP's for combinations of Food Item and Food Option—which may be conveniently sorted and ranked by increasing or decreasing NP's, as appropriate. Then IMOS applies the restaurant's predetermined suggested choices 245 to the customer's food order. Ergo, as a substitute for the instant order, IMOS may propose, at block 250, one or more alternatives, as determined by the restaurant's customized criteria, such as a roast beef sandwich—instead of a hamburger—and/or the substitution of mustard for mayonnaise.

FIGS. 6 and 7 depict the relative improvement associated with substituting mustard for mayonnaise Food Option for a hamburger Food Item. FIG. 6 clearly shows that this substitution reduces the selected condiments' calories from 50 to zero; fat from 5.5 grams to zero; sodium from 400 milligrams to 10 milligrams. The nutritional protein contribution, however, remains the same (zero) as mayonnaise is replaced with mustard. According to the preferred embodiment, IMOS displays these nutritional improvements (see, the exemplary displays depicted in FIGS. 10-12) for the plurality of Food Items (block 250)—corresponding to reduction in fat, salt, calories, etc. It should be understood that the ordering clerk may also have access to this nutritional information, and then could ask the customer if there will be any modifications to the placed-order 255. As shown in choice block 260, the customer either declines to modify the order 270, or accepts a plurality of suggested changes 265.

If the customer retains the original order, IMOS captures the original order, along with pertinent information such as date, time, store, panoply of suggested changes, 275, for subsequent analysis. The order-clerk then inquires whether any additional Food Items will be ordered, block 280. If not, block 290, the clerk collects an appropriate payment, dispenses the selected food, the concomitant receipt, and the IMOS hard-copy report 295 gratuitously indicating additional healthier choices for consideration at a subsequent visit. If there will be additional food ordered, 285, then the loop commencing with block 205 is repeated for the augmented order. On the other hand, if the customer agrees to change the order 265, the clerk enters the changes 300 for further IMOS processing.

IMOS typically records the original order, the suggested changes, the accepted changes, and the date and time for further analysis 305. IMOS then displays the selected revised nutritional values 310 and confirms whether the changes meet the customer's satisfaction 315. If not 325, the customer modifies the order 330 and returns to the order-taking clerk 335 for re-ordering 300. If so 320, the clerk establishes whether any additional Food Items will be ordered 280. If not 290, the customer pays for his food, and receives a conventional receipt accompanied by an IMOS report indicating the impact of the agreed-upon changes, e.g., reducing fat content by a prescribed %, and additional healthier choices to be considered during the next visit 295. The customer's order is filled by restaurant personnel in the usual manner.

Figure 3:
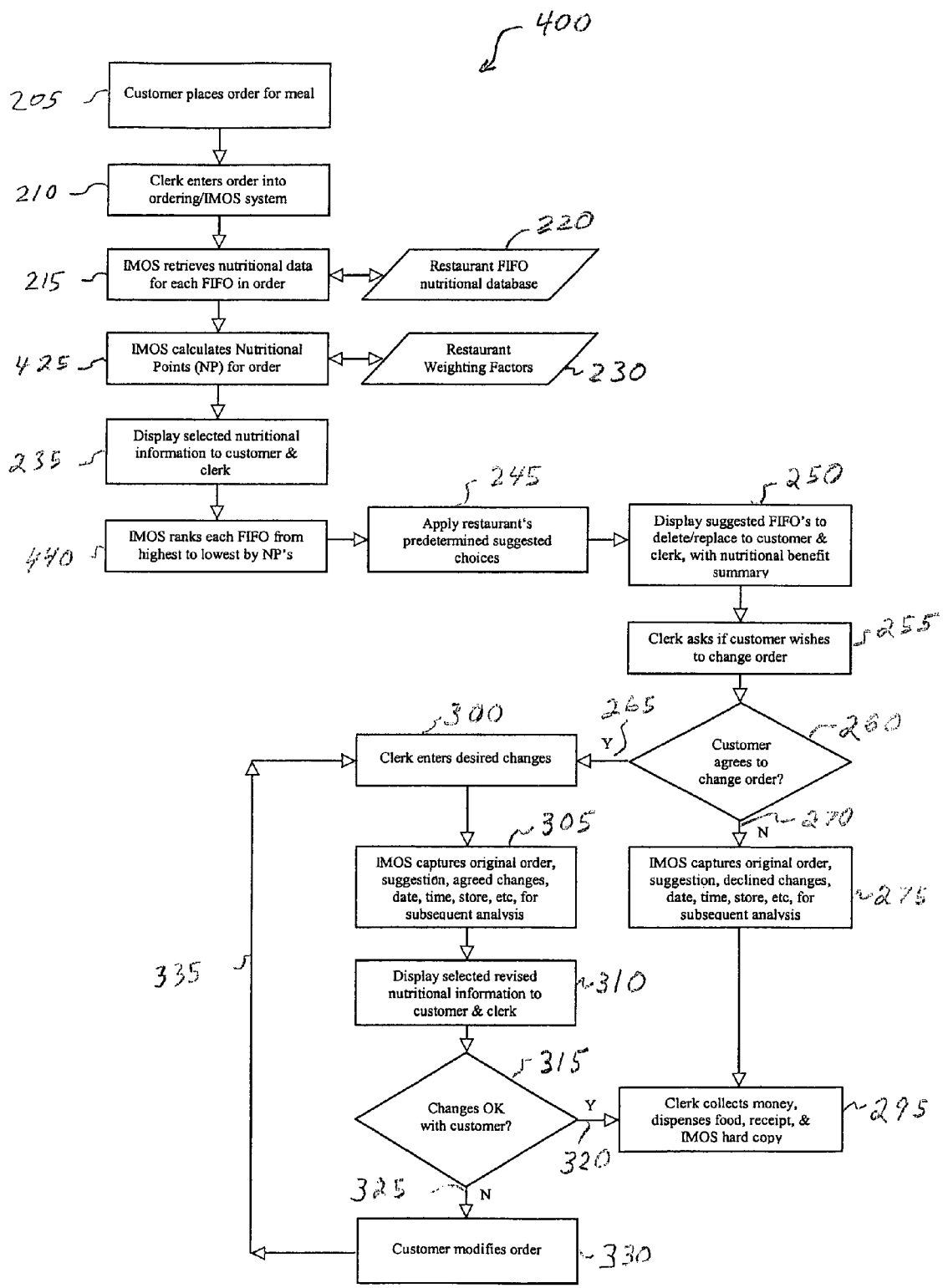
FIG. 3 depicts underlying logic implemented in the preferred embodiment of the present invention for a typical fast-food restaurant, wherein customers place Aggregate Meal orders.

Now referring to FIG. 3, there is depicted the underlying logic implemented in IMOS for a typical fast-food restaurant, wherein customers place orders in real-time. As will be understood by those skilled in the art, overall logic 400 pertains to IMOS ascertaining nutritional values and simultaneously suggesting alternative orders on an Aggregated Meal Basis. The methodology commences with a customer approaching a counter in a conventional fast-food restaurant and promptly being greeted by an employee. As represented in block 205, the customer places an order for the complete meal; in this illustration, a hamburger with a bun, tomato, bacon, and mayonnaise, a side of large French fries, and a large cola. The employee enters this order into the restaurant's combined ordering/IMOS, at block 210.

After retrieving from nutritional database 220 relevant nutritional values for all of the customer's FIFO's 215, IMOS calculates Nutritional Points for the entire order 425, by invoking restaurant's weighting factors 230. Counter display 235 shows the customer relevant nutritional values. More particularly, FIGS. 13, 14, & 15 illustrate representative display screens for the Aggregated Meal Basis; FIG. 13 depicts a customer display of the database tabulation and suggestions using alternative food options; FIG. 14 depicts a customer display of the database tabulation and suggestions using alternative food options in the same food category; FIG. 15 depicts a customer display of the database tabulation and suggestions using alternative food options in a different food category. Block 440 represents IMOS ranking each Food Item—Food Option combination from highest to lowest NP. This ranking may be used by the restaurant to select a plurality of alternatives that have aggressive impact, or a mild impact on the nutritional value of the FIFO currently being ordered. Then, IMOS applies the restaurant's predetermined suggested choices 245 to the customer's order. Next, as a substitute for the instant order, IMOS may propose a plurality of alternatives 250, as determined by the restaurant's customized criteria. Examples include a roast beef sandwich instead of hamburgers, and/or mustard instead of mayonnaise, and/or roasted potatoes instead of French fries, and/or a large diet cola instead of a large regular cola.

FIGS. 8 and 9 show representative nutritional impact of such Food Item and Food Option changes. In particular, FIG. 8 depicts a database table displaying the pertinent nutritional information applicable to the current meal order. FIG. 9 depicts a tabulation of the Nutritional Points associated with the current meal order. IMOS then displays the restaurant's predetermined suggested choices accompanied by a summary of nutritional benefits 250 (see the exemplary displays depicted in FIGS. 13-15). It will be understood that the ordering clerk may also have access to this nutritional information, and then ask the customer if there will be any modifications to the order 255. As shown in choice block 260, the customer either declines to modify the order 270, or accepts a plurality of the suggested changes 265.

If the customer retains the original order 270, the clerk collects money, dispenses the selected food, the concomitant receipt, and the IMOS hard-copy report 295 gratuitously indicating some additional healthier choices for a subsequent visit. IMOS records the original order, the suggested changes, the declined changes, and the date and time for further analysis 275. On the other hand, if the customer agrees to change the order 265, the clerk enters the changes 300 for further IMOS processing.

IMOS records the original order, the suggested changes, the accepted changes, and the date and time for further analysis 305. IMOS then displays the selected revised nutritional values 310 and confirms whether the changes meet the customer's satisfaction 315. If so 320, the clerk is paid by the customer, the clerk dispenses the food, a receipt and IMOS report indicating the impact of the agreed-upon changes (e.g., reducing fat content by a designated %) and additional healthier choices to be considered during the customer's subsequent visits 295. If not 325, the customer modifies the order 330 and return to the order-taking clerk 335 for ordering again 300. The customer's order is ultimately completed by restaurant personnel for the customer's consumption of the Food Items in the usual manner.

Figure 4:
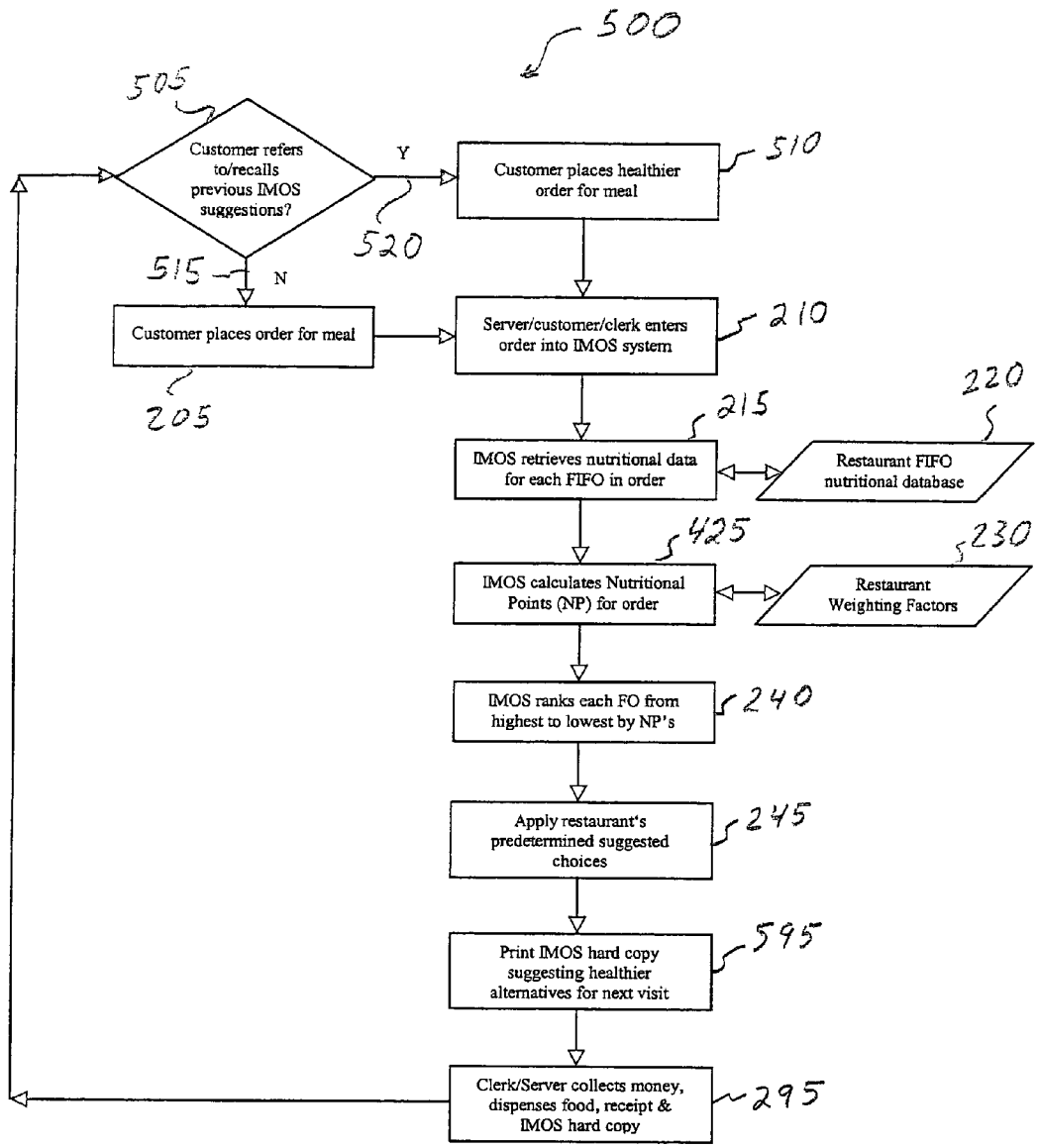
FIG. 4 depicts underlying logic implemented in the preferred embodiment corresponding to post-order feedback procedure.

Referring now to FIG. 4, there is depicted logic diagram 500 corresponding to IMOS' post-order feedback procedure. Restaurants utilizing this feature of IMOS have, for whatever reasons, declined to install a plurality of displays or other means of providing feedback during customer-ordering, or have elected not to utilize displays or other means of providing feedback during a particular moment. Instead, such restaurants have elected to provide a customer current-order-based suggestions applicable for the next restaurant-visit. Thus, as a customer approaches a fast-food restaurant's counter, the customer is greeted by an ordering-taking clerk-employee who is awaiting placement of a food-order. Just prior to placing an order, the customer may opt to refer to a nutrition-biased report that was generated by IMOS during one of the customer's previous visits to the restaurant 505.

If the customer opts into IMOS' suggestions 520, then the order will be modified to attain more nutrition either based upon the content of IMOS report or based upon the customer recalling this plurality of nutrition-biased suggestions 505. The customer places more nutritional order 510 constituting a grilled chicken sandwich (instead of fried chicken) with lettuce and mustard (instead of mayonnaise), a side of small fries (instead of large fries), and a small chocolate milk shake (instead of a large shake). The clerk enters order into restaurant ordering method 210.

Alternatively, this could be a customer's first visit to the restaurant, or the customer could opt out (515) of IMOS' previous suggestions for a healthier meal, whereby the customer places the usual low-nutrition order 205. For this post-ordering procedure, there is no real time display of nutritional information. Thus, the customer then pays for the ordered food 295, and receives an IMOS report indicating healthier choices 595 to be considered during the next visit. It should be understood that the intervening steps describing the IMOS algorithm are analogous to the corresponding steps in the real time feedback procedure. Of course, the customer's order is fulfilled by restaurant personnel in the usual manner.

While the post-ordering procedure does not provide a restaurant with instant feedback on its suggestions—that were accepted or declined by the customer—the restaurant may still obtain useful information on nutritional trends by any number of methods. These methods include: (1) analysis of the nutritional content of customer orders over time, ideally encompassing the periods before and after implementing IMOS; and (2) analysis of the nutritional content of customers' orders over time in geographic areas wherein IMOS has been implemented—versus the nutritional content in areas where IMOS has not been implemented (functioning as a "control group").

It should be evident that both healthy alternatives and time-dependent marketing campaigns are integral to the present invention. Preferably, it is contemplated that prudent restauranteurs would recognize the value of IMOS for promoting customer health and satisfaction. It is also contemplated that restauranteurs will advantageously use embodiments of the present invention to implement appropriate marketing campaigns. Restaurants are, of course, ultimately responsible for determining appropriate nutritional criteria and alternatives therefor, wherein unique niches are established in the marketplace.

Figure 5:
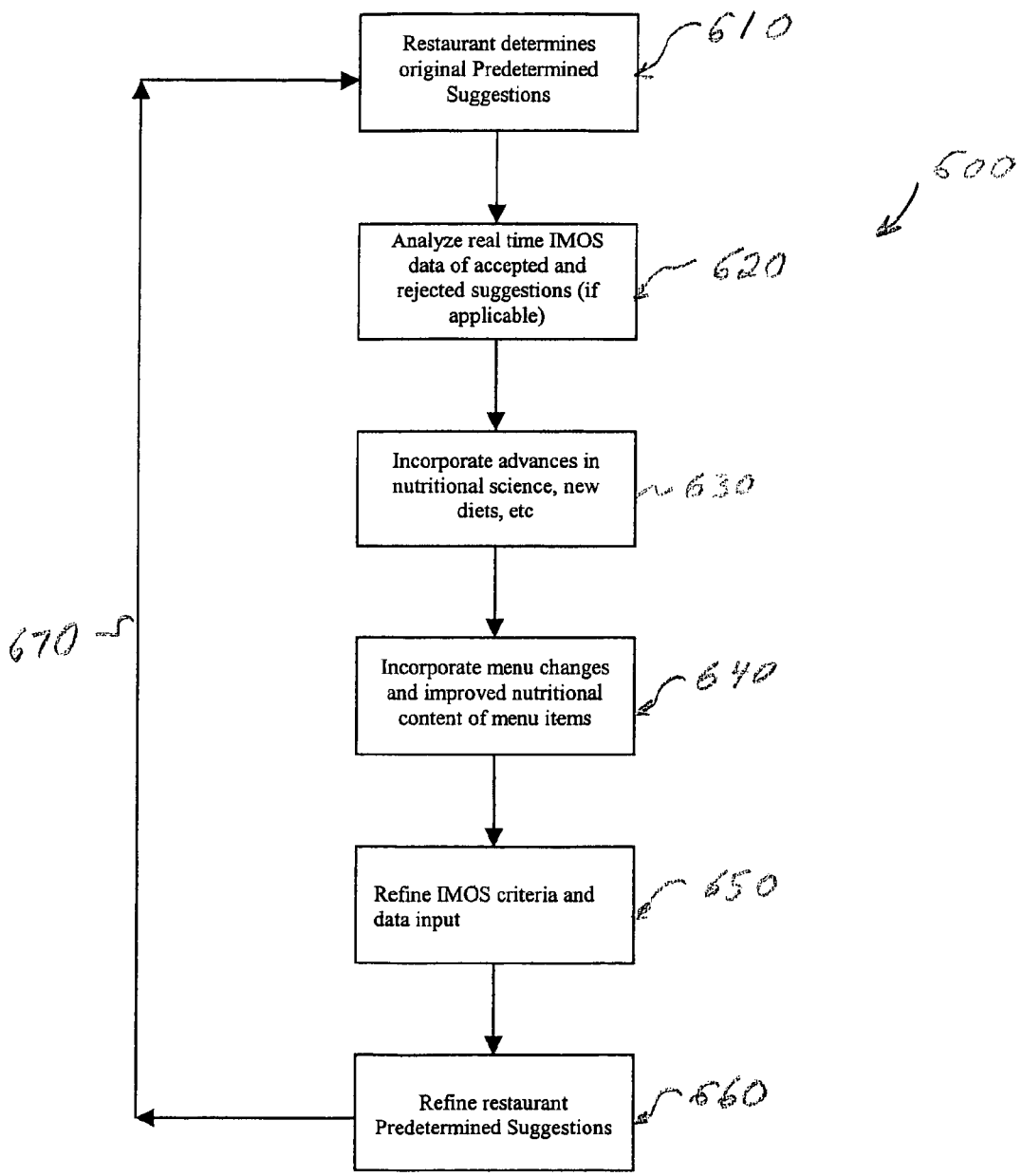
FIG. 5 depicts a simplified schematic of refinement protocol implemented according to the preferred embodiment of the present invention.

To adapt its menu-ordering strategy to changing needs of its customer base, a restaurant should preferably invoke an ongoing refinement and customization procedure for assuring customer satisfaction and synchronization with health and nutrition developments. FIG. 5 depicts a simplified schematic of refinement protocol 600. Initially, in step 610, a restaurant determines a plurality of initial food-selection suggestions. Next, in step 620, a plurality of acceptance and rejection of real-time suggestions are analyzed. In step 630, advances in nutritional science and other health-related developments are incorporated into IMOS algorithms. Then, in step 640, these nutritional and health-related discoveries are mapped into implicated foods, and corresponding menu-changes are effectuated.

It will be appreciated that IMOS-related information gathered by a restaurant will lead to inclusion of menu choices that are both healthier and popular with the restaurant's clientele. Ergo, IMOS menu and food selection criteria and appropriately modifications are made 650 to accommodate customer input and subsequent related customer feedback. Step 660 implements the plurality of modifications to menu-selection criteria in the restaurants menu-suggestions. It has then been found to be advantageous for a restauranteur to reconcile the plurality of refined and customized menu-selections with a restaurant's marketing strategies and then to follow loop 670 to further refine the revised algorithms as deemed necessary.

Another benefit of restaurant-control as taught by IMOS and other embodiments hereof is that restaurants may readily upgrade or otherwise adapt underlying menu-ordering criteria as nutritional science advances. An inherent benefit of embodiments is that the plurality of internal algorithms for supporting customer-ordering protocol afford restaurants heightened emphasis upon having a broad selection of menu items fraught with healthy foods.

In cafeteria-style restaurants, customers typically avail themselves of self-service or by making requests to a behind-the-counter server, whereupon individual food items are successively selected or ordered, respectively, from different food areas, e.g., salad-area, entrée-area, drinks-area, dessert-area, etc. Customers then pay for the meal after all items have been selected.

Accordingly, it should be evident that the post-order feedback protocol schematically represented in FIG. 4 would apply to this scenario. It will also be clear, however, that modifications would be necessary to the procedure depicted in FIGS. 2 and 3 for enabling customers' real-time feedback. For instance, an option for self-service scenarios would be a plurality of displays with a suitable display-device situated in each area of a plurality of Food Item-specific areas.

In each such Food Item-specific area, customers may enter initial food selections and then simultaneously receive IMOS-driven suggestions prior to actually obtaining the food selections for placement thereof on trays or the like. It should be appreciated that another self-service option would be for behind-the-counter servers to have immediate access to feedback displays in their assigned plurality of areas, wherein the server enters the customers initial selection and then provides suggestions forthwith to instigate and anticipate customers effectuating order-modifications.

Another illustrative situation corresponds to a traditional "sit-down" restaurant. In this common scenario, as is well-known in the art, a customer peruses a menu and then orders selected Food Items with a wait-person responsible the particular table. Alternatively, the customer may order one of the daily "specials" recited by the wait-person, either before, during, or after the customer peruses the menu. For this situation, the post-order feedback protocol depicted in FIG. 4 applies.

It is contemplated that, for real-time customer feedback, the wait-person could enter the order into a suitable portable hand-held electronic device or the like. Additionally, of course, the wait-person could verbally offer real-time meal or appetizer or dessert suggestions. Indeed, it is within the teachings of the present invention that such wait-person would carry or wear a feedback display device or that a plurality of feedback display devices could be dispersed throughout restaurant rooms and the like.

Another implementation of embodiments of the present invention would be suitable for drive-through facilities integral to popular fast-food restaurants and the like. For example, in IMOS implementations, essentially the same procedure as depicted in FIGS. 2-4 would be used in drive-through restaurant environments. Obviously, instead of entering a restaurant, per se, customers would remain in their vehicles and enter a drive-through facility. It should also be clearly envisioned that a drive-through customer, akin to a conventional menu-selection screen, would receive real-time visual input upon the same or similar screen, and that a suitable feedback display device, triggered by touch or voice input, would be placed adjacent the drive-through menu. Of course, the customer would still receive an IMOS printout indicating the positive nutritional benefits to be obtained from any modifications to the current order, and additional healthy suggestions for subsequent visits.

The following exemplify applications of IMOS embodiments of the present invention in the context of a fast-food restaurant. A customer enters a fast-food restaurant and places a specific hamburger order. Such an order might include having the hamburger cooked medium and accompanied on a bun with mayonnaise, bacon, and tomato. While this order is placed by the customer—either in its original form or modified to preferably improve its nutritional value—restaurant food preparation personnel are not privy to the interrelationship between the customer and IMOS databases through its customer interfaces. Thus, it should be understood that IMOS simultaneously accesses a food database to ascertain nutritional information that flows from a customer's original order, e.g., the instant combination of hamburger Food Item and mayonnaise, bacon, lettuce and tomato Food Options, restaurant food preparation personnel patiently await the customer's final order. That is, order modification protocol under the present invention is exclusively the customer's domain, and is independent of any action taken by restaurant personnel.

It will be appreciated by those skilled in the art that the instant customer-order implicates any desired number of nutritional attributes selected by the restaurant. In the instant example, the following four nutritional attributes have been selected:

1. Calories
2. Fat (g)
3. Sodium (mg)
4. Protein (g)

According to the teachings of the present invention, food selection based upon Food Category, Food Item, and Food Options is preferably solely determined by and under the control of restaurants and the like. While, as usual, a customer orders Food Items augmented with a plurality of Food Options—which are ideally prepared to the customer's satisfaction—the panoply of menu items available is beyond the customer's control. That is, IMOS contemplates that a customer is and remains anonymous immediately before, during, and after dining in or at a particular restaurant and the like.

Ergo, a restaurant first chooses a set of Nutritional Attributes and then chooses the intended Weighting Factors to be comparatively applied thereto. In this hamburger fast-food example, the Weighting Factors that are chosen by the restaurant for each of the pertinent four Food Items are 1, 50, 0.2, and −20, respectively. It is another aspect of the present invention that food ordered by a customer is assigned relative Nutritional Points.

It will be understood that NP's contemplated hereunder are calculated via a two-step procedure. First, for a particular Food Item, the product of each of its nutritional attributes and the corresponding Weighting Factor for each nutritional attribute, respectively, yields its NP. Second, the total NP for the Food Item is calculated by adding the NP for each of the nutritional attributes. That is, the NP for each nutritional attribute, i.e., calories, fat, sodium, protein, is summed to calculate NP for the Food Item, e.g., the beef hamburger patty.

Nutritional Points are similarly calculated for each Food Option. First, for each option, each of its nutritional attributes is multiplied by the corresponding Weighting Factor, yielding NP. Second, total NP for the Food Option is calculated by adding the NP for each of its nutritional attributes. That is, NP for each nutritional attribute, i.e., calories, fat, sodium, protein, is summed to calculate NP for the Food Option, e.g., bun, cheese, lettuce, tomato, bacon, onion, pickles, ketchup, mayonnaise.

As an example, the NP for an all-beef hamburger patty is calculated by summing the product of each of the implicated nutritional attributes' value and its corresponding Weighting Factor. This series of multiplications followed by a summation is enumerated thus:

(1) Calories: 100 calories multiplied by Nutritional Factor 1
(2) Fat: 8 gm fat multiplied by 50, plus
(3) Sodium: 125 mg sodium multiplied by 0.2, minus
(4) Protein: 7 gm protein multiplied by 20

Those skilled in the art will appreciate that, since the product for protein will be negative because decreasing protein introduces a deleterious nutritional effect: the product is subtracted rather than added. It will be seen that this calculation yields a total of 385 points for the beef hamburger patty. It should be understood that the higher the net NP total, the less-healthy is the food selection. It should also be understood that the present invention contemplates that negative Weighting Factors apply for effecting positive nutritional attributes. In this situation wherein negative Weighting Factors are invoked includes nutritious attributes such as proteins, minerals, and vitamins, etc.

For this particular hamburger-order, including a condiment ensemble of mayonnaise, bacon, and tomato, total NP for the FIFO is:

| | |
|---|---|
| 385.0 | for the beef patty |
| 333.0 | for a serving of mayonnaise |
| 280.0 | for the bacon |
| 222.0 | for the bun |
| 13.6 | for the tomato |
| 1,233.6 | TOTAL |

After assessing the nutritional content of this customer's order, the preferred embodiment of the present invention suggests purportedly healthier selection options in any of a plurality of ways. The nutrition-biased intelligent menu ordering method taught by the present invention.

Now referring to FIGS. 6-9, there are depicted representative portions of the nutritional database contemplated by the preferred embodiment. It will become clear that these underlying data are the basis for enabling a restaurant to present suitable nutritional information to customers during the food-ordering process. In particular, FIG. 6 depicts a database table storing a plurality of Food Options applicable to an order that has a beef hamburger sandwich as its basis. As will be appreciated by those conversant in the art, a typical beef hamburger contains about 100 calories, 8 grams fat, 125 milligrams sodium, and 7 grams protein. Each of the condiments, hereinafter also couched as Food Options shown in this tabulation, inherently potentially contribute nutritional attributes including calories, fat, sodium, and protein to a hamburger preparation.

Still referring to the table in FIG. 6, row 2 represents the affect of a customer foregoing a hamburger on a bun, and simply enjoying the hamburger patty in conjunction with the panoply of condiments that comprise ancillary food options shown in remaining rows 3-11. Row 2 corresponds to the bun Food Option; row 3 corresponds to cheese; row 4 corresponds to lettuce; row 5 corresponds to tomato; row 6 corresponds to bacon; row 7 corresponds to onion; row 8 corresponds to pickles; row 9 corresponds to ketchup; row 10 corresponds to mustard; and row 11 corresponds to mayonnaise.

Hence, by declining to have a beef patty on a bun, the customer would avoid consuming not only 150 calories, but also would avoid consuming 2 gm fat, 260 mg sodium, albeit sacrificing nutrition associated with 4 gm protein. It should be evident that, while affording an expeditious way for customers to reduce adverse nutritional affects of condiments and the like, IMOS may simultaneously reduce advantageous nutritional attributes obtained from a plurality of food options. Thus, 4 gm of protein are reduced as a by-product of a customer ordering a beef hamburger in the absence of a bun.

Similarly, row 3 represents the affect of foregoing a cheeseburger, but nevertheless enjoying a hamburger on a bun in conjunction with a selected panoply of condiments. By preferring to order a beef hamburger without cheese, a customer saves not only 50 calories, but also 4.2 gm fat, 80 mg sodium; simultaneously, however, the customer is deprived of 2.7 gm protein. Row 5 indicates that, by preferring to have a hamburger without tomato, a customer saves 7 calories, 0.2 gm fat, and 3 mg sodium; simultaneously, however, 0.2 gm protein are sacrificed. As shown in row 4, lettuce, on the other hand, besides having a bland taste and imparting bulk to a hamburger sandwich, has neither deleterious nor advantageous nutritional impact.

Deciding to exclude a plurality of condiments, i.e., to exclude bacon and/or onions and/or pickles and/or ketchup and/or mayonnaise on a hamburger, as shown, respectively, in rows 6, 7, 8, 9, and 11, has a more dramatic nutritional impact than excluding lettuce (row 4) or mustard (row 10). Excluding lettuce, as hereinbefore described, has no nutritional impact (at least based upon the Food Factors being considered in this example); excluding mustard has a minimal affect manifest by avoiding 10 mg sodium; excluding bacon saves the customer 70 calories and avoids 5 gm fat and 300 mg sodium, while simultaneously sacrificing 5 gm protein; excluding pickles saves the customer a mere calorie, but also avoids 55 mg sodium and has no detrimental impact upon protein.

The bottom row, i.e., row 13, corresponds to the total value of each of the nutritional attributes depicted in columns 2-5. It should be understood that these nutritional attributes are envisioned as being preferably selected by the restaurant for each pertinent Food Item and concomitant plurality of Food Options. Thus, as shown in column 2, the total calories for the beef hamburger patty depicted in row 1 and for all of the ten Food Options depicted in rows 2-11 is 448. Similarly, in column 3, the total fat is 24.9 gm calculated by summing the fat associated with the beef hamburger patty depicted in row 2 and for all of the ten Food Options depicted in rows 3-12. In column 4, the total sodium is 978 mg; and in column 5, the total protein is 18.9 gm.

Now referring to Table 8, it will be seen for the instant example, that the Weighting Factors selected by the restaurant for each of the nutritional attributes enumerated in columns 2, 3, 4, and 5, respectively, are 1, 50, 0.2, and −20.

TABLE 8

| | Weighting Factors | | | |
| --- | --- | --- | --- | --- |
| | Calories | Fat (g) | Sodium (mg) | Protein (g) |
| Weighting Factors | 1 | 50 | 0.2 | −20 |

As shown in FIG. 7, there is depicted a database table indicating NP's corresponding to the plurality of Food Options applicable to the hamburger beef patty order depicted in FIG. 6. NP is ascertained based upon the hereinbefore referenced calculation methodology which is functionally related to the corresponding nutritional information and predetermined weighting factors. It will be appreciated that FIGS. 6 and 7 demonstrate how the hamburger Food Item and each of the plurality of Food Options affect cumulative NP. Thus, NP's enumerated in column 2 of the tabulation depicted in FIG. 7 for the beef patty and each of 10 Food Options is equal to the number of calories enumerated in column 2 of the tabulation depicted in FIG. 6, multiplied by the Weighting Factor for calories of 1 as depicted in Table 8.

The Nutritional Points stored in each cell depicted in FIG. 7 is calculated by the product of the nutritional value stored in the corresponding cell depicted in FIG. 6 and the corresponding Weighting Factor stored in the appropriate column in Table 8. Ergo, row 1 corresponding to beef patty Food Item in FIG. 7, depicts the NP associated with cells (1,2)=100, (1,3)=400, (1,4)=25, and (1,5)=−140 for calories shown in column 2, fat shown in column 3, for sodium shown in column 4, and for protein shown in column 5, respectively. Row 2 which corresponds to the bun Food Option, depicts the NP associated with cells (2,2)=150, (2,3)=100, (2,4)=52, and (2,5)=−80 for calories shown in column 2, fat shown in column 3, for sodium shown in column 4, and for protein shown in column 5, respectively. Similarly, row 6 which corresponds to the bacon Food Option, depicts the NP associated with cells (6,2)=70, (6,3)=250, (6,4)=60, and (6,5)=−100, respectively. Similarly, row 11 which corresponds to the mayonnaise Food Option, depicts the NP associated with cells (11,2)=50, (11,3)=275, (11,4)=8, and (11,5)=0, respectively.

It will be understood that the total NP associated with the full combination of Food Options for each nutritional attribute is depicted respectively in cell (12,2)=448 (calories); cell (12,3)=1245 (fat); cell (12,4)=195.6 (sodium); and cell (12,5)=−378 (protein). The total NP associated with the beef patty is shown, respectively, in cell (1,6)=385; corresponding to the sum of each value shown in row 2, e.g., cells (2,2)=100 for calories; (2,3)=400 for fat; (2,4)=25 for sodium; and (2,5)= −140 for protein.

As another illustration of the compilation of NP depicted in FIG. 7, row 2 shows the total NP associated with the bun Food Option which is shown in cell (2,6)=222; corresponding to the sum of each value shown in row 3, e.g., cells (3,2)=150 for calories, (3,3)=100 for fat, (3,4)=52 for sodium, and (3,5)=−80 for protein. Similarly, row 12 shows the total NP associated with the mayonnaise Food Option which is depicted in cell (12,6)=333; corresponding to the sum of each value shown in row 12, e.g., cells (12,2)=50 for calories, (12,3)= 275 for fat, (12,4)=8 for sodium, and (12,5)=0 for protein.

In the preferred embodiment, once the NP are calculated as hereinbefore described, IMOS then ranks the selected Food Item and each Food Option in descending order according to NP value. Illustrated in FIG. 7, the largest detriment to nutrition is a beef patty, per se, which boasts the highest NP: 385; next is mayonnaise with 333 NP; then there is bacon with 280 NP; cheese with 222 points; next is a bun also with 222 NP; ketchup with 31 points; tomato with a value of 13.6; next is pickles with 12 NP; onion with 10 points; mustard with 2 points; and lettuce with the lowest NP: 0. Similarly, FIGS. 8 & 9 illustrate an analogous example for the Aggregated Meal Basis, consisting of an order of a hamburger, with a bun, tomato, bacon, mayonnaise, a side order of large French fries, and a large cola.

It should be understood that an IMOS database preferably contains a restaurant-supplied panoply of nutritional information prerequisite for enabling restaurant-customers to make informed food selections based upon nutritional benefits and, of course, personal taste. To accommodate customers' special needs attributable to medical condition and related health issues, or the like, suitable food may be ordered with specific nutritional and health implications; indeed, IMOS uses its database and integral knowledge base to conveniently present such nutrition information when invoked by a customer. It will be appreciated that the method of the present invention strives to achieve, for a restaurant or other food service vendor, a population of satisfied, healthy customers whose personal longevity assures their continual and protracted restaurant-patronage.

Ergo, embodiments of the present invention provide a plurality of feedback devices based upon restaurant and/or customer preferences. Such customer feedback devices would be adapted to render feedback convenient and user-friendly. Underlying algorithms for driving menu-ordering of food selections reflect and take advantage of contemporary nutritional advances and trends. Adaptability and flexibility of restaurant-offered menu selections would appeal to customers and promote their feedback to IMOS and other implementations of the present invention. It is contemplated that effective use of the teachings of the present invention would engender customers improved health by inherently and routinely delivering a valuable nutritional bias thereto both in real-time and in a post-ordering time frame.

It is within the concepts taught herein that other implementations of ordering protocols such as the application of touch or talk-to screens, either internally for food-selection or externally proximal to customer-access areas or drive-through facilities, may be made available for food vendor-suggestions and/or for customer feedback. One illustration of an application of the method taught herein is affecting customer-selections from vending machines and the like.

Figure 18:
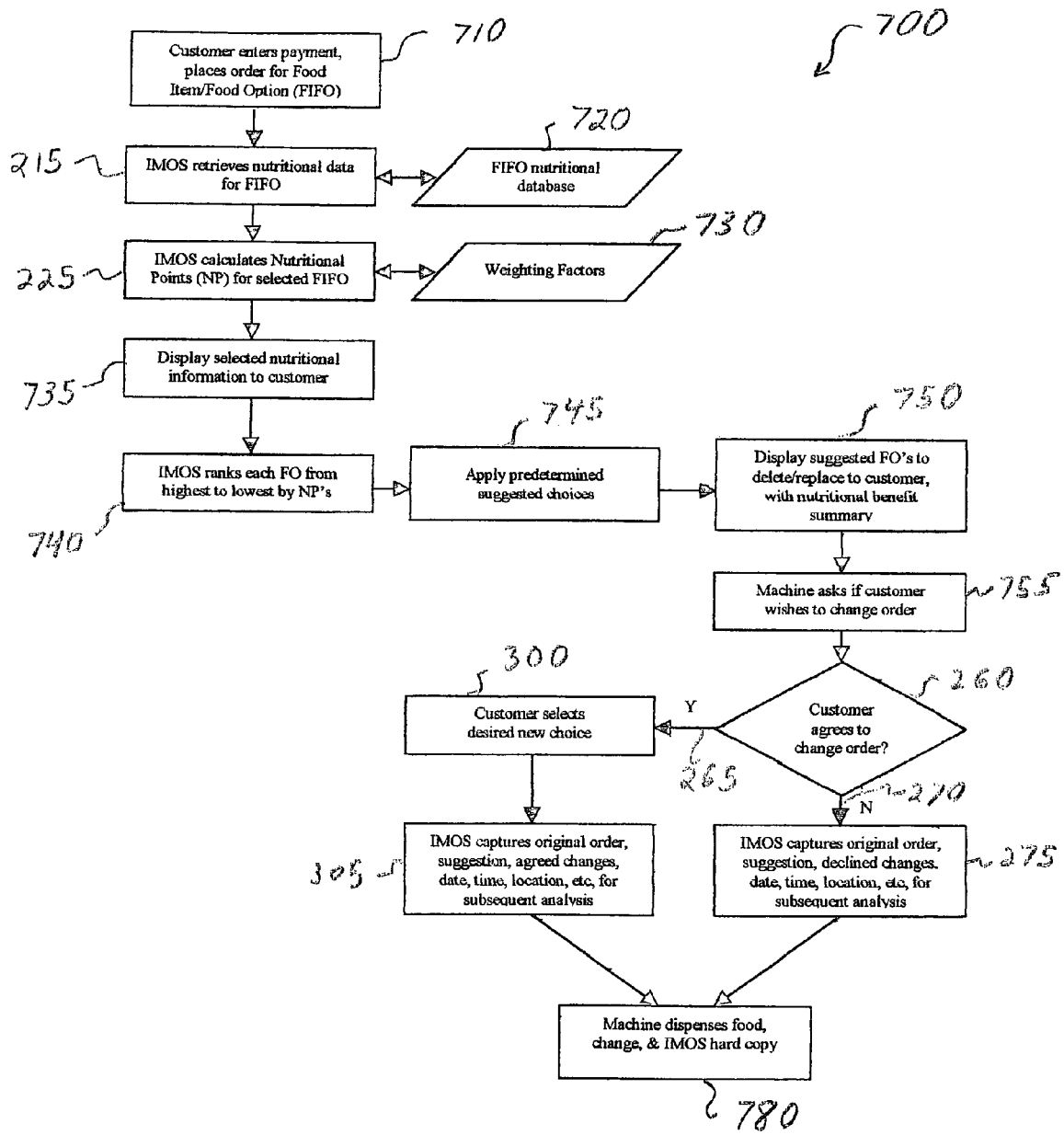
FIG. 18 depicts underlying logic implemented in the preferred embodiment of the present invention for food selection from a typical vending machine in real-time.

As a representative example of vending machine embodiments contemplated under the present invention, and not by limitation, the logic diagram depicted in FIG. 18 is similar to the hereinbefore elucidated diagram depicted in FIG. 2 corresponding to Food Item selection in a restaurant environment. Thus, FIG. 18 depicts the underlying logic implemented in IMOS for a typical vending machine scenario, wherein customers make choices from a conventional menu displayed within the machine's display. As will be understood by those skilled in the art, logic diagram 700 pertains to IMOS ascertaining nutritional values and simultaneously suggesting alternative selections on a Food Item Basis, wherein a Food Item may be chosen with appropriate Food Options. The combination of the chosen Food Item and its corresponding Food Option(s) is again referred to as "FIFO."

The methodology contemplated by the present invention commences when a customer encounters a vending machine. Vending machine display 735 shows the customer relevant nutritional values. Then, analogous to the previously described restaurant scenario, the customer has the option to alter the selected Food Item prior to finalizing the order. More particularly, as represented in block 710, the customer makes a choice for a Food Item and, prior to entering the appropriate payment for this item, IMOS retrieves applicable nutritional data 215 and then calculates corresponding NP 225 by invoking (the vending machine proprietor's) predetermined weighting factors 730. Each possible Food Item is then ranked from highest to lowest NP 740, and, after incorporating the predetermined alternative selections 745 into suggestion protocol (blocks 750, 755), IMOS awaits customer feedback regarding food-selection modifications (blocks 300, 260, 305, 275). Once the customer completes the procedure taught by the present invention, the ordered Food Item for which payment has been made is dispensed by the vending machine concomitantly with hard-copy or the like of the IMOS suggested food alternatives to be considered by the customer for future vending machine selections 780.

Figure 17:
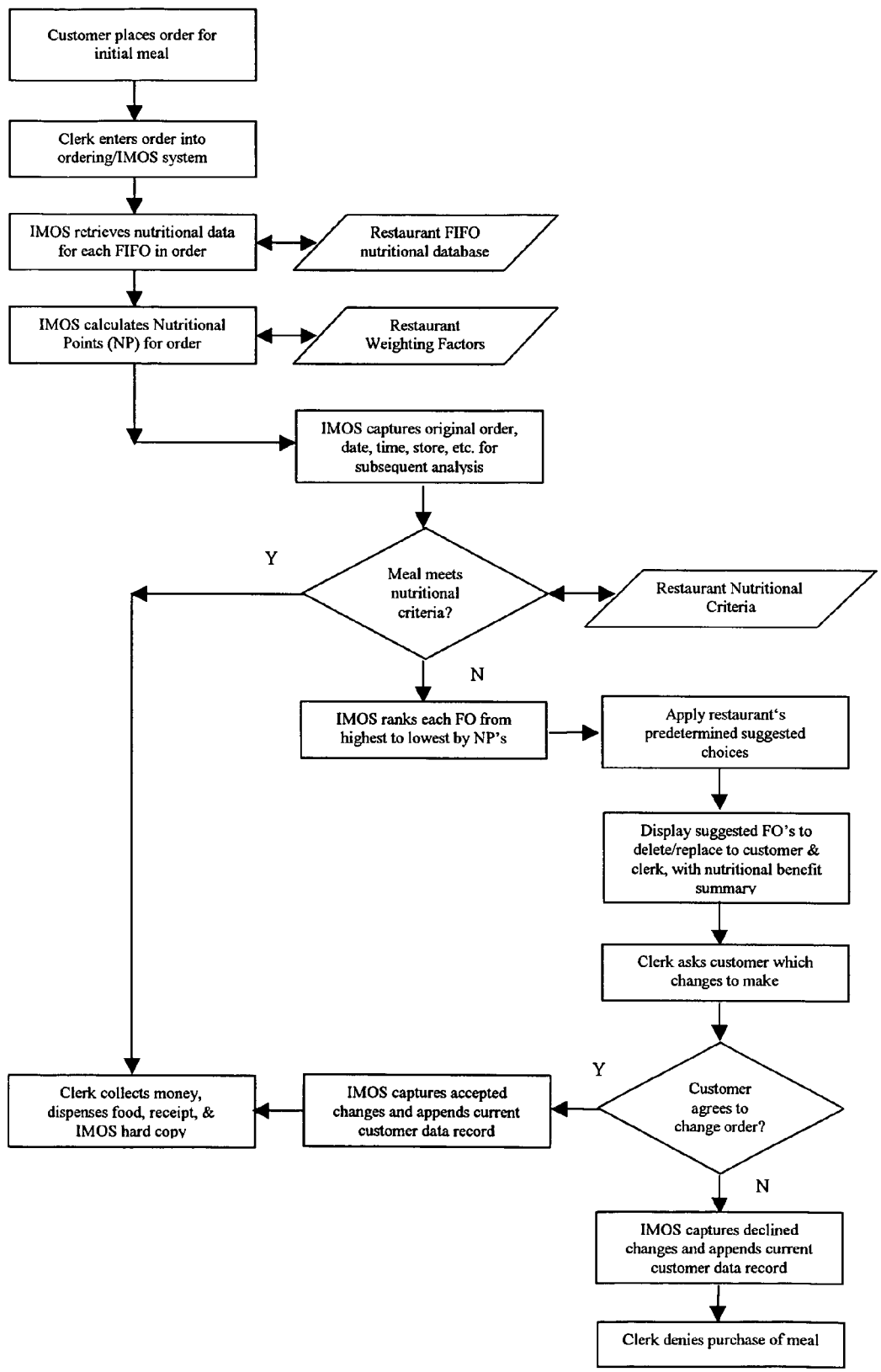
FIG. 17 depicts underlying logic implemented in the preferred embodiment of the present invention for food selection in a school or institutional setting, whereby certain undesirable choices are not available to the customer.

It is well known that obesity among children has been rapidly increasing. Throughout the school year, many children eat lunches at school cafeterias. The meals consumed in such venues can have a significant effect upon obesity, and may enable the children to acquire healthier eating habits that carry over to other meals. Accordingly, another variation of IMOS (the "Limited Choice" basis) covers the case of a school or other institution, where the customer (presumably a child or person on a strict diet) places a food order, and IMOS tests the order against certain dietary restriction criteria. For example, if a child were to order an egregiously unhealthy meal of nachos, a bacon cheeseburger and a large chocolate shake, IMOS might be employed to deny such a purchase, instead suggesting a menu including some healthier choices. Thus, FIG. 17 depicts the underlying logic implemented in IMOS for a representative limited choice scenario recommended for school and institutional environments.

There are, of course, a large number of additional variations to the implementation of IMOS. For example, a restaurant could choose to provide customer access to IMOS "offline," whereby a customer may request healthy alternatives from the restaurant menu independently of food ordering. In this mode of operation, the restaurant could place one or more IMOS ordering stations in the dining room, or in the customer waiting line, for a customer's leisurely use. Another mode of operation would allow customers to obtain IMOS suggestions through a restaurant's website. It should be evident that these approaches contemplate customers being able to identify healthier alternatives in advance of placing an order; this protocol advantageously affords not only additional time for making informed choices, but also minimizes the likelihood that customers are inhibiting ordering efficiency.

Another IMOS variation would provide for customers to be able to request, on an anonymous basis, a set of food establishment suggestions that accommodate their particular health concerns. For example, a restaurant or cafeteria could offer a diabetic customer menu choices featuring high protein, low fat, low cholesterol, and/or low sodium. In this case, the restaurant would invoke an IMOS algorithm presenting such customers sets of alternatives for each Food Item—Food Option combination providing optimal sugar, protein, fat, cholesterol, or sodium choices, respectively. Similarly, a restaurant would advise customers of the availability of special dietary requests through advertising and special promotions, or by inquiring if the customer has any special dietary requests at the time of order placement.

Figure 20:
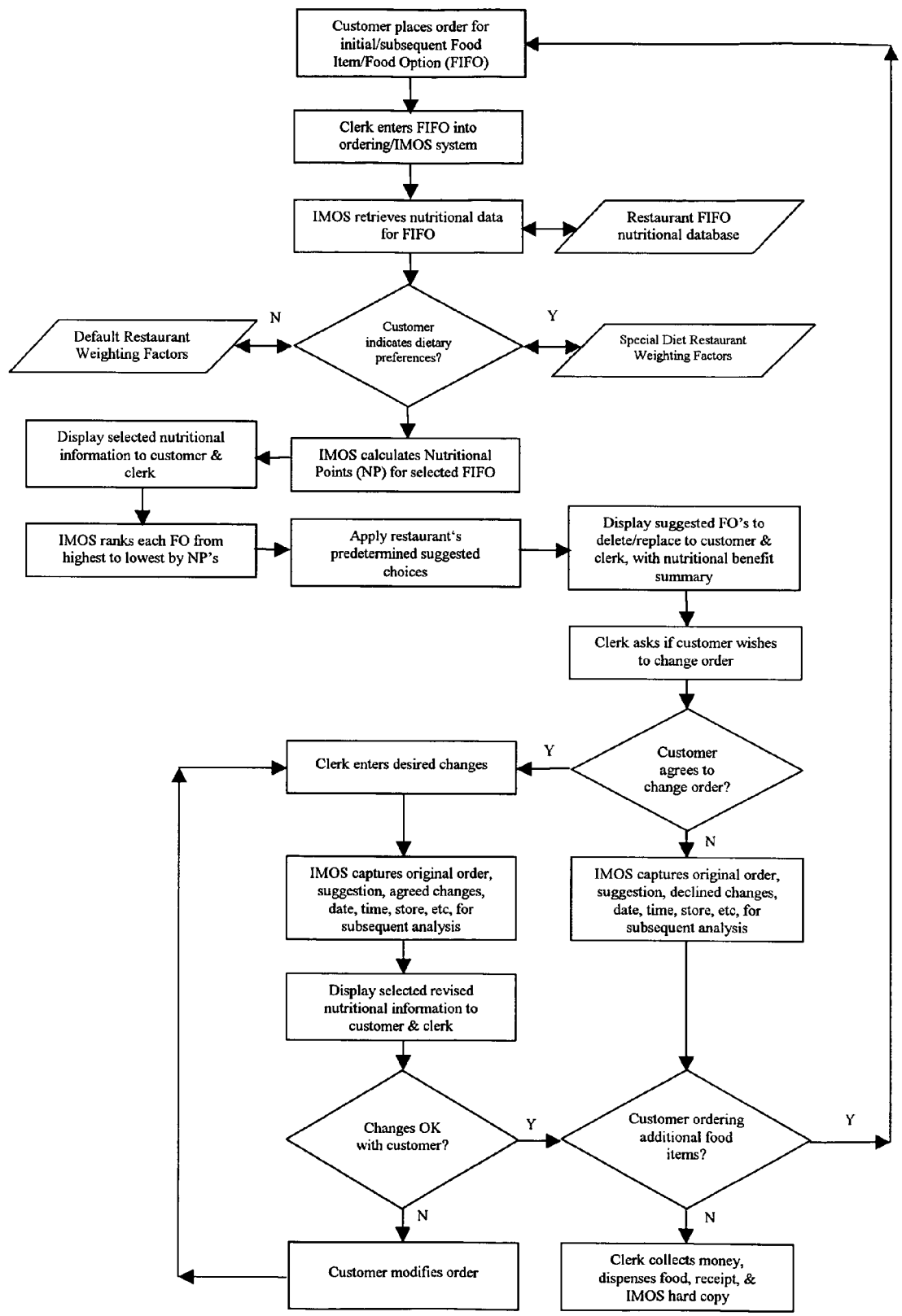
FIG. 20 depicts underlying logic implemented in the preferred embodiment for a typical fast-food restaurant, wherein customers place Food Item orders with special dietary restrictions.

FIG. 20 depicts logic underlying IMOS implementation intended for a typical fast-food restaurant wherein customers place Food Item orders in real-time. As will be understood by those skilled in the art, a customer can indicate dietary preferences during ordering 800. If the customer invokes dietary restrictions, IMOS selects appropriate diet-specific weighting factors 810 predetermined by the restaurant. If the customer does not indicate dietary preferences, IMOS selects the restaurant's default weighting factors 805. It will be understood that once dietary accommodations, if any, have been established, IMOS proceeds in the manner hereinbefore described, wherein IMOS invokes default or special diet weighting factors as appropriate. It should be evident to those skilled in the art, that this methodology is applicable to any other contemplated IMOS strategy, such as Aggregated Meal, Post Order Feedback displayed to customers on vending machines or on menus displayed at schools or institutional cafeterias or other food establishments.

Using the hamburger nutritional information enumerated in FIG. 6 and the weighting factors for a low sodium diet depicted in Table 9, it will be seen that IMOS ascertains hamburger nutritional points for a low sodium diet as shown in FIG. 21.

TABLE 9

Weighting Factors - Low Sodium Diet

|  | Calories | Fat (g) | Sodium (g) | Protein (g) |
|---|---|---|---|---|
| Weighting Factors | 1 | 50 | 2 | −20 |

As will be understood by those skilled in the art, the weighting factor for sodium in Table 9 has been increased by a factor of 10 over the default value. Ergo, a food establishment such as a restaurant would sustain by increasing the weighting factor of any detrimental dietary component by an appropriate amount to minimize the selection of unhealthy alternatives to meet customers' specific dietary needs.

As depicted in FIG. 23, a display screen or the like may advise a customer of confirmation of a special diet order. Preferably, simultaneously this would be augmented with the nutritional attribute values associated with each alternative Food Option. In so doing, IMOS advises this customer that sodium would be reduced by 41% if bacon were replaced with onion. If the customer elects to modify the order by positively responding to the IMOS suggested modification, then the revised order is displayed on-screen. The improved nutritional attribute values are preferably promptly shown for the customer's immediate satisfaction.

Another application of the methodology taught herein is based upon hamburger nutritional information depicted in FIG. 6 and the weighting factors for a high protein diet enumerated in Table 10, As hereinbefore described, hamburger nutritional points for the high protein diet are depicted in FIG. 22. It will be

TABLE 10

Weighting Factors - High Protein Diet

|  | Calories | Fat (g) | Sodium (g) | Protein (g) |
|---|---|---|---|---|
| Weighting Factors | 1 | 50 | 0.2 | −200 | understood that the weighting factor for protein in Table 10 was increased by a factor of 10 over the default value. A restaurant, cafeteria, or like food establishment may similarly increase the weighting factor of any beneficial dietary component in sufficient extent to maximize the selection of healthy alternatives to meet the customer's specific needs.

As depicted in FIG. 24, a display screen may present the customer with confirmation of a special diet order, augmented with the nutritional attribute values associated with each alternative Food Option. IMOS advises this customer that protein could be increased by 17% if mayonnaise is replaced with cheese. If the customer agrees to modify the order by positively responding to the modification request, then the revised order is displayed on-screen. The improved nutritional attribute values are clearly shown for the customer's immediate satisfaction.

It is also contemplated that the instant methodology may be implemented using networked assemblies of computer workstations and the like, which may be interconnected locally and remotely. Such networks may invoke Web-access to have wide appeal across geographically and economically disparate customers. IMOS may be invoked via popular hand-held devices and via freestanding structures such as kiosks and the like. It affords food service customers interactive opportunities to learn about the nutrition and health implications of intelligent food-ordering.

Other variations and modifications will, of course, become apparent from a consideration of the methodology hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A methodology for customer food ordering from an available plurality of menu item selections contained in a food service vendor's menu
   devolving from a food service knowledgebase
      including
         a computerized database of anonymous customer preference information, located on one of a plurality of servers digitally accessible by a plurality of networked computer workstations,
         interrelated with a food ordering computerized database, located on one of a plurality of servers digitally accessible by said plurality of networked computer workstations,
      said plurality of menu item selections
         classified by a plurality of Food Items
            subsumed into a plurality of Food Categories, with said plurality of Food Items served by said food service vendor according to a plurality of related Food Options, with each of said plurality of Food Items, each of said plurality of Food Options, and each of said plurality of Food Categories associated with nutritional attributes and corresponding nutritional attribute Weighting Factors assigned by said food service vendor, and stored in a nutritional computerized database, located on one of said plurality of servers digitally accessible by said plurality of networked computer workstations, and said customer making choices of said plurality of menu item selections to establish a tentative food order and said tentative food order entered into said plurality of servers via one of said plurality of networked computer workstations, said methodology for customer food ordering comprising the steps of:

suggesting to said customer a plurality of alternative Food Items of said plurality of Food Items and/or a plurality of alternative Food Options of said plurality of Food Options and/or a plurality of alternative Food Categories of said plurality of Food Categories with each of said plurality of alternative Food Items and each of said plurality of alternative Food Options and each of said plurality of alternative Food Categories possessing Nutritional Point values calculated and stored within said nutritional computerized database and corresponding to the product of said nutritional attributes and said corresponding Weighting Factors assigned to each of said nutritional attributes for each of said plurality of Food Items, of each of said plurality of related Food Options, and of each of said plurality of related Food Categories, for improving health benefits relevant to said tentative food order by suggesting a substitution for said Food Item or said Food Option or said Food Category with a healthier Food Item or Food Option or Food Category possessing a lower Nutritional Point value;

reconciling, with additional order preference input from said customer, said tentative food order with said suggested plurality of alternative Food Items and said suggested plurality of alternative Food Options;

optionally revising said tentative food order according to said reconciliation by modifying a plurality of said chosen Food Items and/or modifying a plurality of said chosen Food Options to constitute a completed food order;

submitting for fulfillment said completed food order to said food service vendor; and dispensing said submitted completed food order to said customer and updating said computerized database of anonymous customer preference information.

2. The methodology for customer food ordering recited in claim 1, wherein said suggesting step is performed by said food service vendor contemporaneously with said customer establishing said tentative food order.

3. The methodology for customer food ordering recited in claim 1, wherein said suggesting step is performed by said food service vendor simultaneously with said customer establishing said tentative food order.

4. The methodology for customer food ordering recited in claim 1, wherein said suggesting step comprises advising said customer of nutritional attribute values and associated health benefits contingent upon substituting a plurality of said suggested Food Items and a plurality of said suggested Food Options into said tentative food order.

5. The methodology for customer food ordering recited in claim 1, wherein said Nutritional Points are calculated on an Aggregated Meal basis for a plurality of combinations of said Food Items and said Food Options by summing the product of each said nutritional attribute value and each said corresponding Weighting Factor assigned to each said nutritional attribute for each of said plurality of combinations of said Food Items and of said related Food Options constituting said tentative food order.

6. The methodology for customer food ordering recited in claim 5, wherein said suggesting step comprises a healthier aggregation of combinations selected from the group consisting of said plurality of Food Items in the same Food Category, said plurality of Food Items in a different Food Category, or said plurality of associated Food Options, said healthier aggregation having a lower Nutritional Point value than said Nutritional Point value for said aggregation thereof in said tentative food order.

7. The methodology for customer food ordering recited in claim 1, wherein said suggesting step further comprises biasing said suggested Food Items and said suggested Food Options substitutions according to seasonal bias indicative of customer food ordering preferences contained in said food service knowledgebase.

8. The methodology for customer food ordering recited in claim 1, wherein said suggesting step further comprises biasing said suggested Food Items and said suggested Food Options substitutions according to health conditions bias indicative of customer food ordering preferences which are contained in said food service knowledgebase.

9. The methodology for customer food ordering recited in claim 1, wherein said suggesting step further comprises biasing said suggested Food Items and said suggested Food Options substitutions according to said food service vendor marketing bias indicative of customer food ordering preferences which are contained in said food service knowledgebase.

10. The methodology for customer food ordering recited in claim 1, wherein said suggesting step further comprises biasing said suggested Food Items and said suggested Food Options substitutions according to said food service vendor profitability bias indicative of customer food ordering preferences which are contained in said food service knowledgebase.

11. The methodology for customer food ordering recited in claim 1, wherein said suggesting step further comprises biasing said suggested Food Items and said suggested Food Options substitutions according to regional or national bias indicative of customer food ordering preferences which are contained in said food service knowledgebase.

12. The methodology for customer food ordering recited in claim 1, wherein said suggesting step further comprises biasing said suggested Food Items and said suggested Food Options substitutions according to a randomization bias selected from the group consisting of said Food Item basis bias, said Aggregated Meal basis bias, said seasonal suggestion bias, said health condition suggestion bias, said marketing suggestion bias, said profitability suggestion bias, said regional or national suggestion bias, a mild or aggressive suggestion bias, or said customer food ordering preferences, and which are contained in said food service knowledgebase.

13. The methodology for customer food ordering recited in claim 12, wherein said suggesting step further comprises biasing said suggested Food Items and said suggested Food Options substitutions according to said food service vendor mild or aggressive food substitution bias contained in said food service knowledgebase.

14. The methodology for customer food ordering recited in claim 1, wherein said reconciling step comprises comparing said Nutritional Points of each said suggested Food Item with said Nutritional Points of each said Food Item already incorporated into said tentative food order, to establish a Nutritional Points differential.

15. The methodology for customer food ordering recited in claim 1, wherein said reconciling step comprises comparing said Nutritional Points of each said suggested Food Option with said Nutritional Points of each said Food Option already incorporated into said tentative food order, to establish a Nutritional Points differential.

16. The methodology for customer food ordering recited in claim 6, wherein said reconciling step further comprises comparing said Nutritional Points of said healthier aggregated combinations with said Nutritional Points of said aggregated combinations of said tentative food order, to establish a Nutritional Points differential.

17. The methodology for customer food ordering recited in claim 14, wherein said optionally revising step comprises substituting said suggested plurality of Food Items into said tentative food order based upon said Nutritional Points differential being positive, so that said customer obtains a nutritional benefit functionally related to said Nutritional Points differential.

18. The methodology for customer food ordering recited in claim 15, wherein said optionally revising step comprises substituting said suggested plurality of Food Options into said tentative food order based upon said Nutritional Points differential being positive, so that said customer obtains a nutritional benefit functionally related to said Nutritional Points differential.

19. The methodology for customer food ordering recited in claim 16, wherein said optionally revising step comprises substituting said suggested aggregated combinations based upon said Nutritional Points differential being positive, so that said customer obtains a nutritional benefit functionally related to said Nutritional Points differential.

20. The methodology for customer food ordering recited in claim 1, wherein said plurality of nutritional attribute suggestions is presented to said customer on a display device.

21. The methodology for customer food ordering recited in claim 1, wherein said plurality of nutritional attribute suggestions is presented to said customer in printed form.

22. The methodology for customer food ordering recited in claim 1, wherein said plurality of nutritional attribute suggestions is presented to said customer in a freestanding structure.

23. The methodology for customer food ordering recited in claim 1, wherein said suggesting step comprises, during high customer food-ordering periods, presenting said suggestions to said customer subsequent to said customer submitting said completed food order.

24. The methodology for customer food ordering recited in claim 23, wherein said receiving step comprises said customer receiving said suggestions contemporaneously with said completed food order.

25. The methodology for customer food ordering recited in claim 1, wherein said suggesting step comprises, during high customer food-ordering periods, exclusively presenting said Aggregated Meal suggestions to said customer.

26. The methodology for customer food ordering recited in claim 23, wherein said receiving step comprises said customer receiving said suggestions simultaneously with said completed food order.

27. The methodology for customer food ordering recited in claim 1, wherein said submitting step comprises said food service vendor recording frequency of acceptance and rejection in a historical database as a function of date, time, and location for each of said plurality of suggestions for customers' said frequency of revisions to said tentative food orders.

28. The methodology for customer food ordering recited in claim 27, wherein said recording step is performed in real-time.

29. The methodology for customer food ordering recited in claim 27, wherein said suggestions engendered in said suggesting step are refined based upon said customers' said frequency of revisions to said tentative food orders.

30. The methodology for customer food ordering recited in claim 1, wherein said suggestions engendered in said suggesting step are refined based upon nutritional science discoveries.

31. The methodology for customer food ordering recited in claim 29, wherein said plurality of suggestions obtained from said food service knowledgebase are periodically updated based upon said frequency of customer acceptance and rejection of said suggestions for revising said tentative food orders which are contained in said historical database.

32. The methodology for customer food ordering recited in claim 29, wherein said plurality of weighting factors obtained from said food service knowledgebase are periodically updated based upon said frequency of customer acceptance and rejection of said suggestions for revising said tentative food orders which are contained in said historical database.

33. The methodology for customer food ordering recited in claim 29, wherein said plurality of nutritional attributes obtained from said food service knowledgebase are periodically updated based upon said frequency of customer acceptance and rejection of said suggestions for revising said tentative food orders which are contained in said historical database.

34. The methodology for customer food ordering recited in claim 1, wherein said methodology for customer food ordering is invoked in a restaurant.

35. The methodology for customer food ordering recited in claim 34, wherein said methodology for customer food ordering is invoked in a fast-food restaurant.

36. The methodology for customer food ordering recited in claim 34, wherein said methodology for customer food ordering is invoked in a sit-down restaurant.

37. The methodology for customer food ordering recited in claim 1, wherein said methodology for customer food ordering is invoked in a cafeteria.

38. The methodology for customer food ordering recited in claim 1, wherein said methodology for customer food ordering is invoked via a vending machine.

39. The methodology for customer food ordering recited in claim 1, wherein said methodology for customer food ordering is invoked via a customer drive-up window.

40. The methodology for customer food ordering recited in claim 1, wherein said suggesting step is invoked remotely by said customer contemporaneously with said customer placing said tentative food order.

41. The methodology for customer food ordering recited in claim 1, wherein said suggesting step is invoked remotely by said customer with said customer subsequently placing said tentative food order.

42. The methodology for customer food ordering recited in claim 4, wherein said suggesting step is invoked remotely by said customer for acquiring nutritional knowledge about said plurality of menu item selections.

43. The methodology for customer food ordering recited in claim 1, wherein said completed food order is constrained by said food service vendor so that said customer may only invoke said tentative food order that satisfies said approved health benefits.

44. The methodology for customer food ordering recited in claim 43, wherein said tentative food order is functionally related only to said Aggregated Meal basis selection.

45. The methodology for customer food ordering recited in claim 30, wherein said plurality of Weighting Factors obtained from said food service knowledgebase are periodically updated based upon said nutritional science discoveries.

46. The methodology for customer food ordering recited in claim 30, wherein said plurality of nutritional attributes obtained from said food service knowledgebase are periodically updated based upon said nutritional science discoveries.

* * * * *